(12) United States Patent
Sprouse et al.

(10) Patent No.: US 9,043,517 B1
(45) Date of Patent: May 26, 2015

(54) MULTIPASS PROGRAMMING IN BUFFERS IMPLEMENTED IN NON-VOLATILE DATA STORAGE SYSTEMS

(71) Applicant: SanDisk Enterprise IP LLC, Milpitas, CA (US)

(72) Inventors: Steven Sprouse, San Jose, CA (US); Yan Li, Milpitas, CA (US)

(73) Assignee: SANDISK ENTERPRISE IP LLC, Milpitas, CA (US)

( * ) Notice: Subject to any disclaimer, the term of this patent is extended or adjusted under 35 U.S.C. 154(b) by 65 days.

(21) Appl. No.: 14/035,876

(22) Filed: Sep. 24, 2013

Related U.S. Application Data

(60) Provisional application No. 61/858,528, filed on Jul. 25, 2013.

(51) Int. Cl.
*G06F 13/12* (2006.01)
*G06F 13/38* (2006.01)
*G06F 12/02* (2006.01)

(52) U.S. Cl.
CPC ..... *G06F 12/0246* (2013.01); *Y10S 707/99932* (2013.01); *Y10S 707/99933* (2013.01)

(58) Field of Classification Search
None
See application file for complete search history.

(56) References Cited

U.S. PATENT DOCUMENTS

| | | | |
|---|---|---|---|
| 4,916,652 A | 4/1990 | Schwarz et al. |
| 5,270,979 A | 12/1993 | Harari et al. |
| 5,519,847 A | 5/1996 | Fandrich et al. |
| 5,530,705 A | 6/1996 | Malone, Sr. |
| 5,537,555 A | 7/1996 | Landry et al. |
| 5,551,003 A | 8/1996 | Mattson et al. |
| 5,657,332 A | 8/1997 | Auclair et al. |
| 5,666,114 A | 9/1997 | Brodie et al. |
| 5,708,849 A | 1/1998 | Coke et al. |
| 5,765,185 A | 6/1998 | Lambrache et al. |

(Continued)

FOREIGN PATENT DOCUMENTS

| | | |
|---|---|---|
| EP | 1465203 A1 | 10/2004 |
| EP | 1 990 921 A2 | 11/2008 |

(Continued)

OTHER PUBLICATIONS

International Search Report and Written Opinion dated Jul. 25, 2014, received in International Patent Application No. PCT/US2014/029453, which corresponds to U.S. Appl. No. 13/963,444, 9 pages (Frayer).

(Continued)

*Primary Examiner* — Kris Rhu
(74) *Attorney, Agent, or Firm* — Morgan, Lewis & Bockius LLP

(57) ABSTRACT

The various implementations described herein include systems, methods and/or devices used to enable multipass programming in buffers implemented in non-volatile data storage systems (e.g., using one or more flash memory devices). In one aspect, a portion of memory (e.g., a page in a block of a flash memory device) may be programmed many (e.g., 1000) times before an erase is required. Some embodiments include systems, methods and/or devices to integrate Bloom filter functionality in a non-volatile data storage system, where a portion of memory storing one or more bits of a Bloom filter array may be programmed many (e.g., 1000) times before the contents of the portion of memory need to be moved to an unused location in the memory.

30 Claims, 8 Drawing Sheets

(56) References Cited

U.S. PATENT DOCUMENTS

| | | |
|---|---|---|
| 5,943,692 A | 8/1999 | Marberg et al. |
| 5,982,664 A | 11/1999 | Watanabe |
| 6,000,006 A | 12/1999 | Bruce et al. |
| 6,016,560 A | 1/2000 | Wada et al. |
| 6,018,304 A | 1/2000 | Bessios |
| 6,070,074 A | 5/2000 | Perahia et al. |
| 6,138,261 A | 10/2000 | Wilcoxson et al. |
| 6,182,264 B1 | 1/2001 | Ott |
| 6,192,092 B1 | 2/2001 | Dizon et al. |
| 6,295,592 B1 | 9/2001 | Jeddeloh |
| 6,311,263 B1 | 10/2001 | Barlow et al. |
| 6,412,042 B1 | 6/2002 | Paterson et al. |
| 6,442,076 B1 | 8/2002 | Roohparvar |
| 6,449,625 B1 | 9/2002 | Wang |
| 6,484,224 B1 | 11/2002 | Robins et al. |
| 6,516,437 B1 | 2/2003 | Van Stralen et al. |
| 6,678,788 B1 | 1/2004 | O'Connell |
| 6,757,768 B1 | 6/2004 | Potter et al. |
| 6,775,792 B2 | 8/2004 | Ulrich et al. |
| 6,810,440 B2 | 10/2004 | Micalizzi, Jr. et al. |
| 6,836,808 B2 | 12/2004 | Bunce et al. |
| 6,836,815 B1 | 12/2004 | Purcell et al. |
| 6,842,436 B2 | 1/2005 | Moeller |
| 6,871,257 B2 | 3/2005 | Conley et al. |
| 6,895,464 B2 | 5/2005 | Chow et al. |
| 6,978,343 B1 | 12/2005 | Ichiriu |
| 6,980,985 B1 | 12/2005 | Amer-Yahia et al. |
| 6,981,205 B2 | 12/2005 | Fukushima et al. |
| 6,988,171 B2 | 1/2006 | Beardsley et al. |
| 7,020,017 B2 | 3/2006 | Chen et al. |
| 7,028,165 B2 | 4/2006 | Roth et al. |
| 7,032,123 B2 | 4/2006 | Kane et al. |
| 7,043,505 B1 | 5/2006 | Teague et al. |
| 7,100,002 B2 | 8/2006 | Shrader |
| 7,111,293 B1 | 9/2006 | Hersh et al. |
| 7,162,678 B2 | 1/2007 | Saliba |
| 7,173,852 B2 | 2/2007 | Gorobets et al. |
| 7,184,446 B2 | 2/2007 | Rashid et al. |
| 7,328,377 B1 | 2/2008 | Lewis et al. |
| 7,516,292 B2 | 4/2009 | Kimura et al. |
| 7,523,157 B2 | 4/2009 | Aguilar, Jr. et al. |
| 7,527,466 B2 | 5/2009 | Simmons |
| 7,529,466 B2 | 5/2009 | Takahashi |
| 7,571,277 B2 | 8/2009 | Mizushima |
| 7,574,554 B2 | 8/2009 | Tanaka et al. |
| 7,596,643 B2 | 9/2009 | Merry, Jr. et al. |
| 7,681,106 B2 | 3/2010 | Jarrar et al. |
| 7,685,494 B1 | 3/2010 | Varnica et al. |
| 7,707,481 B2 | 4/2010 | Kirschner et al. |
| 7,761,655 B2 | 7/2010 | Mizushima et al. |
| 7,774,390 B2 | 8/2010 | Shin |
| 7,840,762 B2 | 11/2010 | Oh et al. |
| 7,870,326 B2 | 1/2011 | Shin et al. |
| 7,890,818 B2 | 2/2011 | Kong et al. |
| 7,913,022 B1 | 3/2011 | Baxter |
| 7,925,960 B2 | 4/2011 | Ho et al. |
| 7,934,052 B2 | 4/2011 | Prins et al. |
| 7,954,041 B2 | 5/2011 | Hong et al. |
| 7,971,112 B2 | 6/2011 | Murata |
| 7,974,368 B2 | 7/2011 | Shieh et al. |
| 7,978,516 B2 | 7/2011 | Olbrich et al. |
| 7,996,642 B1 | 8/2011 | Smith |
| 8,006,161 B2 | 8/2011 | Lestable et al. |
| 8,032,724 B1 | 10/2011 | Smith |
| 8,042,011 B2 | 10/2011 | Nicolaidis et al. |
| 8,069,390 B2 | 11/2011 | Lin |
| 8,190,967 B2 | 5/2012 | Hong et al. |
| 8,254,181 B2 | 8/2012 | Hwang et al. |
| 8,259,506 B1 | 9/2012 | Sommer et al. |
| 8,312,349 B2 | 11/2012 | Reche et al. |
| 8,412,985 B1 | 4/2013 | Bowers et al. |
| 2002/0024846 A1 | 2/2002 | Kawahara et al. |
| 2002/0083299 A1 | 6/2002 | Van Huben et al. |
| 2002/0152305 A1 | 10/2002 | Jackson et al. |
| 2002/0162075 A1 | 10/2002 | Talagala et al. |
| 2002/0165896 A1 | 11/2002 | Kim |
| 2003/0041299 A1 | 2/2003 | Kanazawa et al. |
| 2003/0043829 A1 | 3/2003 | Rashid et al. |
| 2003/0088805 A1 | 5/2003 | Majni et al. |
| 2003/0093628 A1 | 5/2003 | Matter et al. |
| 2003/0188045 A1 | 10/2003 | Jacobson |
| 2003/0189856 A1 | 10/2003 | Cho et al. |
| 2003/0198100 A1 | 10/2003 | Matsushita et al. |
| 2003/0212719 A1 | 11/2003 | Yasuda et al. |
| 2004/0024957 A1 | 2/2004 | Lin et al. |
| 2004/0024963 A1 | 2/2004 | Talagala et al. |
| 2004/0073829 A1 | 4/2004 | Olarig |
| 2004/0153902 A1 | 8/2004 | Machado et al. |
| 2004/0181734 A1 | 9/2004 | Saliba |
| 2004/0199714 A1 | 10/2004 | Estakhri et al. |
| 2004/0237018 A1 | 11/2004 | Riley |
| 2005/0060456 A1 | 3/2005 | Shrader et al. |
| 2005/0060501 A1 | 3/2005 | Shrader |
| 2005/0114587 A1 | 5/2005 | Chou et al. |
| 2005/0172065 A1 | 8/2005 | Keays |
| 2005/0172207 A1 | 8/2005 | Radke et al. |
| 2005/0193161 A1 | 9/2005 | Lee et al. |
| 2005/0201148 A1 | 9/2005 | Chen et al. |
| 2005/0231765 A1 | 10/2005 | So et al. |
| 2005/0257120 A1 | 11/2005 | Gorobets et al. |
| 2005/0273560 A1 | 12/2005 | Hulbert et al. |
| 2005/0289314 A1 | 12/2005 | Adusumilli et al. |
| 2006/0039196 A1 | 2/2006 | Gorobets et al. |
| 2006/0039227 A1 | 2/2006 | Lai et al. |
| 2006/0053246 A1 | 3/2006 | Lee |
| 2006/0085671 A1 | 4/2006 | Majni et al. |
| 2006/0087893 A1 | 4/2006 | Nishihara et al. |
| 2006/0136570 A1 | 6/2006 | Pandya |
| 2006/0156177 A1 | 7/2006 | Kottapalli et al. |
| 2006/0195650 A1 | 8/2006 | Su et al. |
| 2006/0259528 A1 | 11/2006 | Dussud et al. |
| 2007/0011413 A1 | 1/2007 | Nonaka et al. |
| 2007/0058446 A1 | 3/2007 | Hwang et al. |
| 2007/0061597 A1 | 3/2007 | Holtzman et al. |
| 2007/0076479 A1 | 4/2007 | Kim et al. |
| 2007/0081408 A1 | 4/2007 | Kwon et al. |
| 2007/0083697 A1 | 4/2007 | Birrell et al. |
| 2007/0091677 A1 | 4/2007 | Lasser et al. |
| 2007/0113019 A1 | 5/2007 | Beukema et al. |
| 2007/0133312 A1 | 6/2007 | Roohparvar |
| 2007/0147113 A1 | 6/2007 | Mokhlesi et al. |
| 2007/0150790 A1 | 6/2007 | Gross et al. |
| 2007/0157064 A1 | 7/2007 | Falik et al. |
| 2007/0174579 A1 | 7/2007 | Shin |
| 2007/0180188 A1 | 8/2007 | Fujibayashi et al. |
| 2007/0201274 A1 | 8/2007 | Yu et al. |
| 2007/0208901 A1 | 9/2007 | Purcell et al. |
| 2007/0234143 A1 | 10/2007 | Kim |
| 2007/0245061 A1 | 10/2007 | Harriman |
| 2007/0277036 A1 | 11/2007 | Chamberlain et al. |
| 2007/0279988 A1 | 12/2007 | Nguyen |
| 2007/0291556 A1 | 12/2007 | Kamei |
| 2007/0294496 A1 | 12/2007 | Goss et al. |
| 2007/0300130 A1 | 12/2007 | Gorobets |
| 2008/0019182 A1 | 1/2008 | Yanagidaira et al. |
| 2008/0022163 A1 | 1/2008 | Tanaka et al. |
| 2008/0052446 A1 | 2/2008 | Lasser et al. |
| 2008/0056005 A1 | 3/2008 | Aritome |
| 2008/0077841 A1 | 3/2008 | Gonzalez et al. |
| 2008/0077937 A1 | 3/2008 | Shin et al. |
| 2008/0086677 A1 | 4/2008 | Yang et al. |
| 2008/0144371 A1 | 6/2008 | Yeh et al. |
| 2008/0147964 A1 | 6/2008 | Chow et al. |
| 2008/0147998 A1 | 6/2008 | Jeong |
| 2008/0148124 A1 | 6/2008 | Zhang et al. |
| 2008/0163030 A1 | 7/2008 | Lee |
| 2008/0168191 A1 | 7/2008 | Biran et al. |
| 2008/0168319 A1 | 7/2008 | Lee et al. |
| 2008/0170460 A1 | 7/2008 | Oh et al. |
| 2008/0229000 A1 | 9/2008 | Kim |
| 2008/0229003 A1 | 9/2008 | Mizushima et al. |
| 2008/0229176 A1 | 9/2008 | Arnez et al. |
| 2008/0270680 A1 | 10/2008 | Chang |
| 2008/0282128 A1 | 11/2008 | Lee et al. |

(56) References Cited

U.S. PATENT DOCUMENTS

| | | | |
|---|---|---|---|
| 2008/0285351 A1 | 11/2008 | Shlick et al. | |
| 2008/0313132 A1* | 12/2008 | Hao et al. | 707/2 |
| 2009/0003058 A1 | 1/2009 | Kang | |
| 2009/0037652 A1 | 2/2009 | Yu et al. | |
| 2009/0125671 A1 | 5/2009 | Flynn et al. | |
| 2009/0144598 A1 | 6/2009 | Yoon et al. | |
| 2009/0168525 A1 | 7/2009 | Olbrich et al. | |
| 2009/0172258 A1 | 7/2009 | Olbrich et al. | |
| 2009/0172259 A1 | 7/2009 | Prins et al. | |
| 2009/0172260 A1 | 7/2009 | Olbrich et al. | |
| 2009/0172261 A1 | 7/2009 | Prins et al. | |
| 2009/0172262 A1 | 7/2009 | Olbrich et al. | |
| 2009/0172308 A1 | 7/2009 | Prins et al. | |
| 2009/0172335 A1 | 7/2009 | Kulkarni et al. | |
| 2009/0172499 A1 | 7/2009 | Olbrich et al. | |
| 2009/0193058 A1 | 7/2009 | Reid | |
| 2009/0207660 A1 | 8/2009 | Hwang et al. | |
| 2009/0222708 A1 | 9/2009 | Yamaga | |
| 2009/0228761 A1 | 9/2009 | Perlmutter et al. | |
| 2009/0292972 A1 | 11/2009 | Seol et al. | |
| 2009/0296466 A1 | 12/2009 | Kim et al. | |
| 2009/0296486 A1 | 12/2009 | Kim et al. | |
| 2009/0319864 A1 | 12/2009 | Shrader | |
| 2010/0002506 A1 | 1/2010 | Cho et al. | |
| 2010/0037012 A1 | 2/2010 | Yano et al. | |
| 2010/0061151 A1 | 3/2010 | Miwa et al. | |
| 2010/0091535 A1 | 4/2010 | Sommer et al. | |
| 2010/0103737 A1 | 4/2010 | Park | |
| 2010/0161936 A1 | 6/2010 | Royer et al. | |
| 2010/0199125 A1 | 8/2010 | Reche | |
| 2010/0202196 A1 | 8/2010 | Lee et al. | |
| 2010/0208521 A1 | 8/2010 | Kim et al. | |
| 2010/0262889 A1 | 10/2010 | Bains | |
| 2010/0281207 A1 | 11/2010 | Miller et al. | |
| 2010/0281342 A1 | 11/2010 | Chang et al. | |
| 2011/0051513 A1 | 3/2011 | Shen et al. | |
| 2011/0083060 A1 | 4/2011 | Sakurada et al. | |
| 2011/0113281 A1 | 5/2011 | Zhang et al. | |
| 2011/0131444 A1 | 6/2011 | Buch et al. | |
| 2011/0173378 A1 | 7/2011 | Filor et al. | |
| 2011/0199825 A1 | 8/2011 | Han et al. | |
| 2011/0205823 A1 | 8/2011 | Hemink et al. | |
| 2011/0213920 A1 | 9/2011 | Frost et al. | |
| 2011/0228601 A1 | 9/2011 | Olbrich et al. | |
| 2011/0231600 A1 | 9/2011 | Tanaka et al. | |
| 2012/0096217 A1 | 4/2012 | Son et al. | |
| 2012/0110250 A1 | 5/2012 | Sabbag et al. | |
| 2012/0151124 A1 | 6/2012 | Baek et al. | |
| 2012/0151253 A1 | 6/2012 | Horn | |
| 2012/0151294 A1 | 6/2012 | Yoo et al. | |
| 2012/0195126 A1 | 8/2012 | Roohparvar | |
| 2012/0239976 A1 | 9/2012 | Cometti et al. | |
| 2012/0284587 A1 | 11/2012 | Yu et al. | |
| 2013/0036418 A1* | 2/2013 | Yadappanavar et al. | 718/1 |
| 2013/0179646 A1 | 7/2013 | Okubo et al. | |
| 2013/0343131 A1 | 12/2013 | Wu et al. | |
| 2014/0095775 A1 | 4/2014 | Talagala et al. | |
| 2014/0122818 A1* | 5/2014 | Hayasaka et al. | 711/162 |
| 2014/0143505 A1* | 5/2014 | Sim et al. | 711/143 |

FOREIGN PATENT DOCUMENTS

| | | |
|---|---|---|
| JP | 2002-532806 S | 10/2002 |
| WO | WO 2007/036834 A2 | 4/2007 |
| WO | WO 2007/080586 A2 | 7/2007 |
| WO | WO 2008/121553 A1 | 10/2008 |
| WO | WO 2008/121577 A1 | 10/2008 |
| WO | WO 2009/028281 A1 | 3/2009 |
| WO | WO 2009/032945 A1 | 3/2009 |
| WO | WO 2009/058140 A1 | 5/2009 |
| WO | WO 2009/084724 | 7/2009 |
| WO | WO 2009/134576 A1 | 11/2009 |
| WO | WO 2011/024015 | 3/2011 |

OTHER PUBLICATIONS

International Search Report and Written Opinion dated Mar. 7, 2014, received in International Patent Application No. PCT/US2013/074772, which corresponds to U.S. Appl. No. 13/831,218, 10 pages (George).

International Search Report and Written Opinion dated Mar. 24, 2014, received in International Patent Application No. PCT/US2013/074777, which corresponds to U.S. Appl. No. 13/831,308, 10 pages (George).

International Search Report and Written Opinion dated Mar. 7, 2014, received in International Patent Application No. PCT/US2013/074779, which corresponds to U.S. Appl. No. 13/831,374, 8 pages (George).

Barr, Introduction to Watchdog Timers, Oct. 2001, 3 pgs.

Canim, Buffered Bloom ilters on Solid State Storage, ADMS* 10, Singapore, Sep. 13-17, 2010, 8 pgs.

Kang, A Multi-Channel Architecture for High-Performance NAND Flash-Based Storage System, J. Syst. Archit., 53, 9, Sep. 2007, 15 pgs.

Kim, A Space-Efficient Flash Translation Layer for CompactFlash Systems, May 2002, 10 pgs.

Lu, A Forest-structured Bloom Filter with Flash Memory, MSST 2011, Denver, CO, May 23-27, 2011, article, 6 pgs.

Lu, A Forest-structured Bloom Filter with Flash Memory, MSST 2011, Denver, CO, May 23-27, 2011, presentation slides, 25 pgs.

McLean, Information Technology—AT Attachment with Packet Interface Extension, Aug. 19, 1998, 339 pgs.

Park, A High Performance Controller for NAND Flash-Based Solid State Disk (NSSD), Feb. 12 16, 2006, 4 pgs.

Pliant Technology, International Search Report / Written Opinion, PCT/US08/88133, Mar. 19, 2009, 7 pgs.

Pliant Technology, International Search Report / Written Opinion, PCT/US08/88136, Mar. 19, 2009, 7 pgs.

Pliant Technology, International Search Report / Written Opinion, PCT/US08/88146, Feb. 26, 2009, 10 pgs.

Pliant Technology, International Search Report / Written Opinion, PCT/US08/88154, Feb. 27, 2009, 8 pgs.

Pliant Technology, International Search Report / Written Opinion, PCT/US08/88164, Feb. 13, 2009, 6 pgs.

Pliant Technology, International Search Report / Written Opinion, PCT/US08/88206, Feb. 18, 2009, 8 pgs.

Pliant Technology, International Search Report / Written Opinion, PCT/US08/88217, Feb. 19, 2009, 7 pgs.

Pliant Technology, International Search Report / Written Opinion, PCT/US08/88229, Feb. 13, 2009, 7 pgs.

Pliant Technology, International Search Report / Written Opinion, PCT/US08/88232, Feb. 19, 2009, 8 pgs.

Pliant Technology, International Search Report / Written Opinion, PCT/US08/88236, Feb. 19, 2009, 7 pgs.

Pliant Technology, International Search Report / Written Opinion, PCT/US2011/028637, Oct. 27, 2011, 11 pgs.

Pliant Technology, Supplementary ESR, 08866997.3, Feb. 23, 2012, 6 pgs.

SanDisk Enterprise IP LLC, International Search Report / Written Opinion, PCT/US2012/042764, Aug. 31, 2012, 12 pgs.

SanDisk Enterprise IP LLC, International Search Report / Written Opinion, PCT/US2012/042771, Mar. 4, 2013, 14 pgs.

SanDisk Enterprise IP LLC, International Search Report / Written Opinion, PCT/US2012/042775, Sep. 26, 2012, 8 pgs.

SanDisk Enterprise IP LLC, International Search Report / Written Opinion, PCT/US2012/059447, Jun. 6, 2013, 12 pgs.

SanDisk Enterprise IP LLC, International Search Report / Written Opinion, PCT/US2012/059453, Jun. 6, 2013, 12 pgs.

Sandisk Enterprise IP LLC, International Search Report / Written Opinion, PCT/US2012/059459, Feb. 14, 2013, 9 pgs.

SanDisk Enterprise IP LLC, International Search Report / Written Opinion, PCT/US2012/065914, May 23, 2013, 7 pgs.

(56) References Cited

OTHER PUBLICATIONS

SanDisk Enterprise IP LLC, International Search Report / Written Opinion, PCT/US2012/065916, Apr. 5, 2013, 7 pgs.
SanDisk Enterprise IP LLC, International Search Report / Written Opinion, PCT/US2012/065919, Jun. 17, 2013, 8 pgs.
SanDisk Enterprise IP LLC, Notification of the Decision to Grant a Patent Right for Patent for Invention, CN 200880127623.8, Jul. 4, 2013, 1 pg.
SanDisk Enterprise IP LLC, Office Action, CN 200880127623.8, Apr. 18, 2012, 12 pgs.
SanDisk Enterprise IP LLC, Office Action, CN 200880127623.8, Dec. 31, 2012, 9 pgs.
SanDisk Enterprise IP LLC, Office Action, JP 2010-540863, Jul. 24 2012, 3 pgs.
Watchdog Timer and Power Savin Modes, Microchip Technology Inc., 2005, 14 pgs.
Zeidman, 1999 Verilog Designer's Library, 9 pgs.

* cited by examiner

MULTIPASS PROGRAMMING IN BUFFERS IMPLEMENTED IN NON-VOLATILE DATA STORAGE SYSTEMS

RELATED APPLICATIONS

This application claims the benefit of U.S. Provisional Patent Application No. 61/858,528, filed on Jul. 25, 2013, which is incorporated by reference herein.

TECHNICAL FIELD

The disclosed embodiments relate generally to memory systems, and in particular, to using non-volatile data storage systems to implement Bloom filters.

BACKGROUND

Semiconductor memory devices, including flash memory, typically utilize memory cells to store data as an electrical value, such as an electrical charge or voltage. A flash memory cell, for example, includes a single transistor with a floating gate that is used to store a charge representative of a data value. Flash memory is a non-volatile data storage device that can be electrically erased and reprogrammed. Non-volatile memory retains stored information even when not powered, as opposed to volatile memory, which requires power to maintain the stored information. In an address-targeted write to memory, a host supplies an address and the data to be written. In an address-targeted read from memory, a host supplies an address from which to read. However, when memory is used to implement data structures such as Bloom filters, using address-targeted read and write methods to access memory is not ideal.

SUMMARY

Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to enable multipass programming in buffers implemented in non-volatile data storage systems (e.g., using one or more flash memory devices). In one aspect, a portion of memory (e.g., a page in a block of a flash memory device) may be programmed many (e.g., 1000) times before the contents of the portion of memory need to be moved to a new (e.g., unused) location in the memory.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

Figure 1:
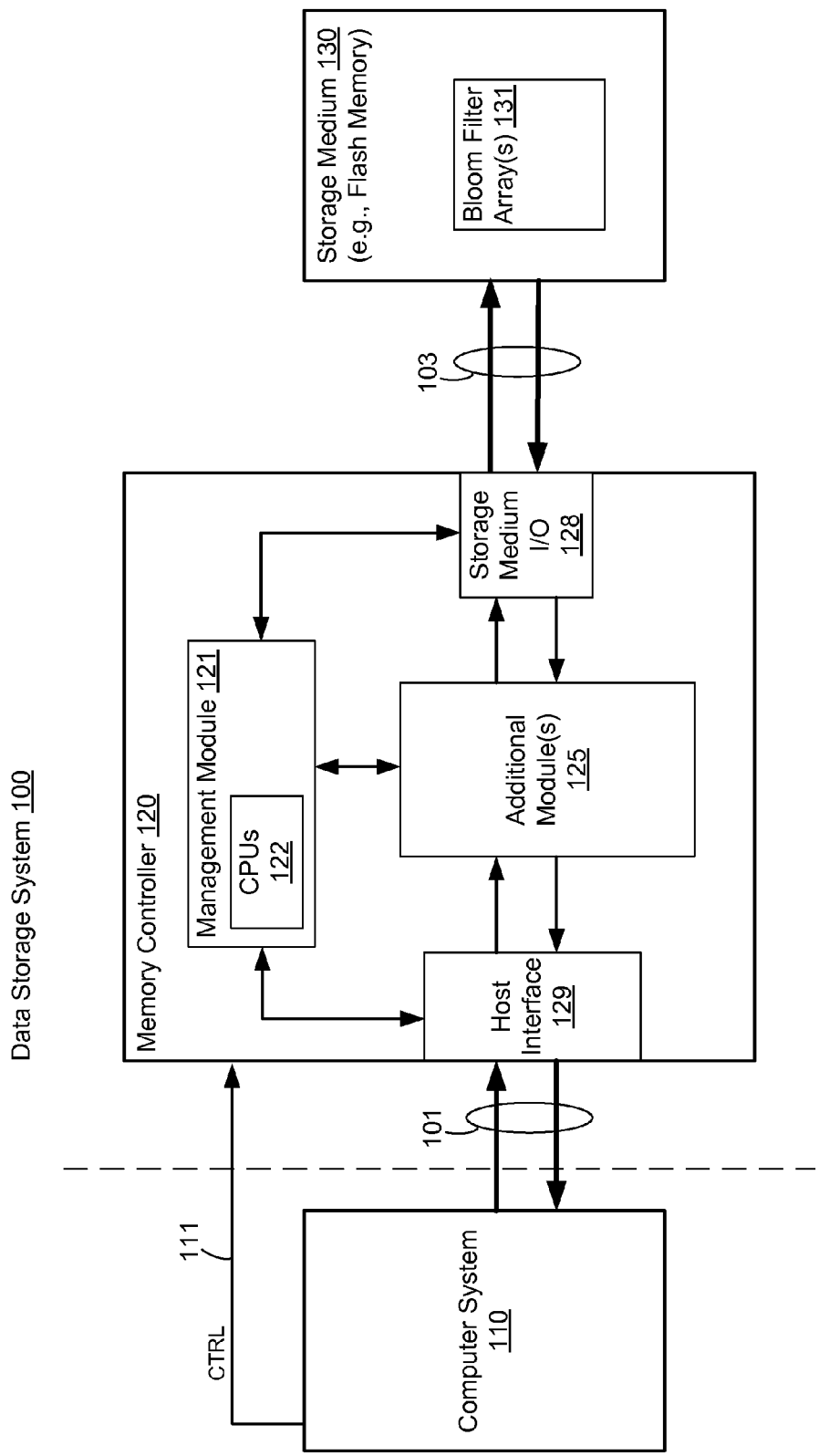
FIG. 1 is a block diagram illustrating an implementation of a data storage system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Many applications use a data structure called a Bloom filter to determine whether an element is a member of a set (e.g., whether an object is already physically present in a storage media). Bloom filter arrays (the storage aspect of a Bloom filter) can be implemented with dynamic random-access memory (DRAM), but this can become prohibitively expensive as the size of the set grows. In embodiments disclosed below, for applications where large Bloom filters are needed, NAND flash storage devices are used.

The various implementations described herein include systems, methods and/or devices used to enable multipass programming in buffers implemented in non-volatile data storage systems (e.g., using one or more flash memory devices). Some implementations include systems, methods and/or devices to integrate Bloom filter functionality in the non-volatile data storage system, where a portion of memory storing one or more bits of a Bloom filter array may be programmed many (e.g., 1000) times before the contents of the portion of memory need to be moved to a new (e.g., unused) location in the memory.

More specifically, some implementations include a method for data processing. In some implementations, at a non-volatile data storage system, the method includes receiving from a host a plurality of requests that specify respective elements. The method further includes, for each respective element specified by the received requests, (1) generating a respective set of k bit positions in a Bloom filter, using k distinct hash functions, where k is an integer greater than 2, and (2) setting the respective set of k bit positions in the Bloom filter, wherein the Bloom filter is stored in a non-volatile storage medium of the non-volatile data storage system. Further, in some embodiments, setting a respective bit position of the k bit positions in the Bloom filter includes (1) accessing usage information for a storage medium portion of the non-volatile storage medium that includes the respective bit position in the Bloom filter, (2) determining whether the usage information for the storage medium portion meets predefined multipass programming criteria, (3) if the usage information for the storage medium portion meets the predefined multipass programming criteria, setting the respective bit position in the Bloom filter in the storage medium portion, and (4) if the usage information for the storage medium portion does not meet the predefined multipass programming criteria, identifying a respective unused portion of the non-volatile storage medium, copying Bloom filter information in the storage medium portion to the identified portion of the non-volatile storage medium, and setting the respective bit position in the Bloom filter.

In some embodiments, the method includes generating the respective set of k bit positions in the Bloom filter using one or more processors of the non-volatile data storage system.

In some embodiments, the method includes generating the respective set of k bit positions in the Bloom filter using k parallel processors of the non-volatile data storage system.

In some embodiments, if the usage information for the storage medium portion does not meet the predefined multipass programming criteria, the method further includes scheduling erasure of the storage medium portion of the non-volatile storage medium.

In some embodiments, scheduling erasure of the storage medium portion is performed after setting the respective bit position in the Bloom filter.

In some embodiments, determining whether the usage information for the storage medium portion meets predefined multipass programming criteria includes (1) determining whether the usage information indicates the storage medium portion of the non-volatile data storage system has been programmed no more than m times, where m is an integer of at least 1000, (2) if the storage medium portion of the non-volatile data storage system has been programmed no more than m times, the usage information for the storage medium portion meets the predefined multipass programming criteria, and (3) if the storage medium portion of the non-volatile data storage system has been programmed more than m times, the usage information for the storage medium portion does not meet the predefined multipass programming criteria.

In some embodiments, setting the respective set of k bit positions in the storage medium includes out of order word line programming.

In some embodiments, the method further includes receiving an element for testing with respect to the Bloom filter. The method further includes testing whether the element is present in the Bloom filter, by (1) processing the element with the k distinct hash functions to generate a set of k bit positions, (2) reading the set of k bit positions from the Bloom filter, (3) returning a first result if all the k bit positions in the Bloom filter from the set are set, and (4) returning a second result if one or more of the k bit positions in the Bloom filter from the set are not set.

In some embodiments, the non-volatile storage medium includes one or more flash memory devices.

In some embodiments, the non-volatile data storage system is distinct from the host.

In some embodiments, the non-volatile data storage system is embedded in the host.

In some embodiments, the respective elements specified by the plurality of requests comprise a plurality of objects.

In some embodiments, the respective elements specified by the plurality of requests comprise n-bit fingerprints of a plurality of objects, where n is at least 64.

In another aspect, any of the methods described above are performed by a non-volatile data storage system comprising (1) a non-volatile storage medium storing a Bloom filter, (2) one or more processors, and (3) memory storing one or more programs, which when executed by the one or more processors cause the non-volatile data storage system to perform any of the methods described above.

In yet another aspect, a non-transitory computer readable storage medium stores one or more programs configured for execution by one or more processors of a non-volatile data storage system, the one or more programs comprising instructions for causing the non-volatile data storage system to perform any of the methods described above.

In yet another aspect, a non-volatile data storage system is configured to process data in accordance with any of the methods described above. In some embodiments, the non-volatile data storage system includes means for receiving from a host a plurality of requests that specify respective elements, and means for processing each respective element specified by the received requests, including (1) means for generating a respective set of k bit positions in a Bloom filter, using k distinct hash functions, where k is an integer greater than 2, and (2) means for setting the respective set of k bit positions in the Bloom filter, wherein the Bloom filter is stored in a non-volatile storage medium of the non-volatile data storage system. Further, in some embodiments, the means for setting includes means for setting a respective bit position of the k bit positions in the Bloom filter, which includes (1) means for accessing usage information for a storage medium portion of the non-volatile storage medium that includes the respective bit position in the Bloom filter, (2) means for determining whether the usage information for the storage medium portion meets predefined multipass programming criteria, (3) means for setting the respective bit position in the Bloom filter in the storage medium portion if the usage information for the storage medium portion meets the predefined multipass programming criteria, and (4) means for identifying a respective unused portion of the non-volatile storage medium, copying Bloom filter information in the storage medium portion to the identified portion of the non-volatile storage medium, and setting the respective bit position in the Bloom filter, if the usage information for the storage medium portion does not meet the predefined multipass programming criteria.

Numerous details are described herein in order to provide a thorough understanding of the example implementations illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

FIG. 1 is a diagram of an implementation of a data storage system 100, in accordance with some embodiments. While some example features are illustrated, various other features have not been illustrated for the sake of brevity and so as not to obscure more pertinent aspects of the example implementations disclosed herein. To that end, as a non-limiting example, the data storage system 100 includes a memory controller 120, and a storage medium 130, and is used in conjunction with a computer system 110. In some implementations, storage medium 130 is a single flash memory device while in other implementations storage medium 130 includes a plurality of flash memory devices. In some implementations, storage medium 130 is NAND-type flash memory or NOR-type flash memory. Further, in some implementations memory controller 120 is a solid-state drive (SSD) controller. However, other types of storage media may be included in accordance with aspects of a wide variety of implementations.

Computer system 110 is coupled to memory controller 120 through data connections 101. However, in some implementations computer system 110 includes memory controller 120 as a component and/or a sub-system. Computer system 110 may be any suitable computer device, such as a computer, a laptop computer, a tablet device, a netbook, an internet kiosk, a personal digital assistant, a mobile phone, a smart phone, a gaming device, a computer server, or any other computing device. Computer system 110 is sometimes called a host or host system. In some implementations, computer system 110 includes one or more processors, one or more types of memory, a display and/or other user interface components such as a keyboard, a touch screen display, a mouse, a trackpad, a digital camera and/or any number of supplemental devices to add functionality.

Storage medium 130 is coupled to memory controller 120 through connections 103. Connections 103 are sometimes called data connections, but typically convey commands in addition to data, and optionally convey metadata, error correction information and/or other information in addition to data values to be stored in storage medium 130 and data values read from storage medium 130. In some implementations, however, memory controller 120 and storage medium 130 are included in the same device as components thereof. Furthermore, in some implementations memory controller 120 and storage medium 130 are embedded in a host device, such as a mobile device, tablet, other computer or computer controlled device, and the methods described herein are performed by the embedded memory controller. Storage medium 130 may include any number (i.e., one or more) of memory devices including, without limitation, non-volatile semiconductor memory devices, such as flash memory. For example, flash memory devices can be configured for enterprise storage suitable for applications such as cloud computing, or for caching data stored (or to be stored) in secondary storage, such as hard disk drives. Additionally and/or alternatively, flash memory can also be configured for relatively smaller-scale applications such as personal flash drives or hard-disk replacements for personal, laptop and tablet computers. Furthermore, as discussed in more detail below, flash memory devices can be configured to implement data structures such as Bloom filter array(s) 131.

A Bloom filter (e.g., Bloom filter array(s) 131) is a probabilistic data structure used to determine if an element "x" is a member of a set "S" with high probability. A Bloom filter is constructed using an N-bit array that is initially cleared, and has hash functions where $0 \leq \text{Hash}(x,k) \leq N-1$. For each element "x" in set "S," k hash functions are computed, and the k corresponding bits in the N-bit array are set. In some embodiments, a Bloom filter is initially cleared by resetting the N-bit array to all zeros, and the k corresponding bits in the N-bit array are set to ones. In some embodiments, a Bloom filter is initially cleared by resetting the N-bit array to all ones, and the k corresponding bits in the N-bit array are set to zeros. While the labeling of memory cell states as having specific data values is somewhat arbitrary, with respect to flash memory devices, memory cells that have been reset are typically said to represent ones, and memory cells that have been set are typically said to represent zeros. However, any labeling or mapping of memory cell states to data values can be used, as long as it is used consistently.

As an example, to test an element "w" for membership in the set "S," the k hash functions are generated for element "w" and the k bit positions are tested. If the k bit positions are set, then the element "w" is most likely a member of set "S," with a possibility of this membership being a "false positive." A false positive is when the Bloom filter returns a result that an element is a member of the set "S," when in actuality it is not. Bloom filters return fewer false positives when the number of elements in the set "S" is an order of magnitude smaller than the number of bits in the bit array. The probability of a false positive is given by equation (1):

$$(1-e^{-k(n+0.5)/(m-1)})^k \quad (1)$$

In equation (1), k represents the number of hash functions per element, m represents the number of bits in the Bloom filter, and n is the number of elements stored in the Bloom filter.

Storage medium 130 is divided into a number of addressable and individually selectable blocks. In some implementations, the individually selectable blocks are the minimum size erasable units in a flash memory device. In other words, each block contains the minimum number of memory cells that can be erased simultaneously. Each block is usually further divided into a plurality of pages and/or word lines, where each page or word line is typically an instance of the smallest individually accessible (readable) portion in a block. In some implementations (e.g., using some types of flash memory), the smallest individually accessible unit of a data set, however, is a sector, which is a subunit of a page. That is, a block includes a plurality of pages, each page contains a plurality of sectors, and each sector is the minimum unit of data for reading data from the flash memory device.

For example, one block comprises any number of pages, for example, 64 pages, 128 pages, 256 pages or another suitable number of pages. Blocks are typically grouped into a plurality of zones. Each block zone can be independently managed to some extent, which increases the degree of parallelism for parallel operations and simplifies management of storage medium 130.

In some implementations, memory controller 120 includes a management module 121, a host interface 129, a storage medium interface (I/O) 128, and additional module(s) 125. Memory controller 120 may include various additional features that have not been illustrated for the sake of brevity and so as not to obscure more pertinent features of the example implementations disclosed herein, and a different arrangement of features may be possible. Host interface 129 provides an interface to computer system 110 through data connections 101. Similarly, storage medium I/O 128 provides an interface to storage medium 130 though connections 103. In some implementations, storage medium I/O 128 includes read and write circuitry, including circuitry capable of providing reading signals to storage medium 130 (e.g., reading threshold voltages for NAND-type flash memory).

In some implementations, management module 121 includes one or more processing units (CPUs, also sometimes called processors) 122 configured to execute instructions in one or more programs (e.g., in management module 121). In some implementations, the one or more CPUs 122 are shared by one or more components within, and in some cases, beyond the function of memory controller 120. Management module 121 is coupled to host interface 129, additional module(s) 125 and storage medium I/O 128 in order to coordinate the operation of these components.

Additional module(s) 125 are coupled to storage medium I/O 128, host interface 129, and management module 121. As an example, additional module(s) 125 may include an error control module to limit the number of uncorrectable errors inadvertently introduced into data during writes to memory or reads from memory. In some embodiments, additional module(s) 125 are executed in software by the one or more CPUs 122 of management module 121, and, in other embodiments, additional module(s) 125 are implemented in whole or in part using special purpose circuitry (e.g., to perform encoding and decoding functions).

During an address-targeted write operation, host interface 129 receives data to be stored in storage medium 130 from computer system 110. The data held in host interface 129 is made available to an encoder (e.g., in additional module(s) 125), which encodes the data to produce one or more codewords. The one or more codewords are made available to storage medium I/O 128, which transfers the one or more codewords to storage medium 130 in a manner dependent on the type of storage medium being utilized.

An address-targeted read operation is initiated when computer system (host) 110 sends one or more host read commands on control line 111 to memory controller 120 requesting data from storage medium 130. Memory controller 120 sends one or more read access commands to storage medium 130, via storage medium I/O 128, to obtain raw read data in accordance with memory locations (addresses) specified by the one or more host read commands. Storage medium I/O 128 provides the raw read data (e.g., comprising one or more codewords) to a decoder (e.g., in additional module(s) 125). If the decoding is successful, the decoded data is provided to host interface 129, where the decoded data is made available to computer system 110. In some implementations, if the decoding is not successful, memory controller 120 may resort to a number of remedial actions or provide an indication of an irresolvable error condition.

Bloom filter implementations using address-targeted write and read operations would require transferring large amounts of data between computer system (host) 110 and data storage system 100. For example, to add an object "X" to Bloom filter array(s) 131, computer system 110 would generate k hashes and then initiate k read-modify-write commands to data storage system 100. In some examples, this would require the sensing, transfer, modification, and write back of k×4 KB pages. As another example, to test an element for presence in Bloom filter array(s) 131, computer system 110 would initiate k read commands. Instead of using address-targeted write and read operations, which require computer system 110 to generate k hashes and/or initiate k commands to data storage system 100, Bloom filter functionality is integrated in data storage system 100, as described below and with reference to FIG. 2.

When Bloom filter functionality is integrated in data storage system 100, computer system 110 is not required to generate k hashes and initiate k commands in order to add an object "X" to Bloom filter array(s) 131. Instead, in some implementations, computer system 110 transfers object "X" directly to data storage system 100 as an element to add to Bloom filter array(s) 131. In some implementations, computer system 110 generates a fingerprint of object "X" (e.g., an n-bit fingerprint of object "X," where n is at least 64) and transfers the fingerprint of object "X" directly to data storage system 100 as an element to add to Bloom filter array(s) 131. For each element received from computer system 110 to add to Bloom filter array(s) 131, data storage system 100 generates k bit positions in Bloom filter array(s) 131, using k distinct hash functions, where k is an integer greater than 2. Further, data storage system 100 sets the k bit positions in Bloom filter array(s) 131 (e.g., using write circuitry in storage medium I/O 128). Thus, only a single host command (e.g., "Add Element") is needed to add an element to Bloom filter array(s) 131, reducing data transfers between computer system 110 and memory controller 120.

Further, when Bloom filter functionality is integrated in data storage system 100, computer system 110 is not required to initiate k read commands in order to test whether an element is present in Bloom filter array(s) 131. Instead, similar to the process described above for adding an element to Bloom filter array(s) 131, in some implementations, computer system 110 transfers an element (e.g., object "X" or a fingerprint of object "X") directly to data storage system 100 in order to test whether the element is present in Bloom filter array(s) 131. For each element received from computer system 110 for testing, data storage system 100 processes the element with k distinct hash functions to generate k bit positions in Bloom filter array(s) 131 and reads the k bit positions from Bloom filter array(s) 131 (e.g., using read circuitry in storage medium I/O 128). In some embodiments, data storage system 100 returns a first result in accordance with a determination that all the k bit positions are set (e.g., indicating that the element is present in Bloom filter array(s) 131 with high probability) or returns a second result in accordance with a determination that at least a predetermined number (e.g., one or more) of the k bit positions in the Bloom filter are not set (e.g., indicating that the element is not present in Bloom filter array(s) 131). Thus, only a single host command (e.g., "Test Element") is needed to test for an element's presence in Bloom filter array(s) 131, reducing data transfers between computer system 110 and memory controller 120.

In some implementations, computer system 110 resets Bloom filter array(s) 131 with a single host command (e.g., "Reset Filter"). Data storage system 100 responds to a reset command by resetting Bloom filter array(s) 131 to an empty state. In some embodiments, Bloom filter array(s) 131 is cleared by resetting the array to all zeros. In some embodiments, Bloom filter array(s) 131 is cleared by resetting the array to all ones. As explained above, with respect to flash memory devices, memory cells that have been reset are typically said to represent ones.

When Bloom filter functionality is integrated in data storage system 100, data transfers between storage medium I/O 128 and storage medium 130 can also be reduced. In some embodiments, storage medium 130 is implemented using NAND flash memory. NAND flash memory devices have on-chip logical function capabilities with the ability to do simple bit-wise operations (e.g., AND, OR, INVERT, and XOR). Bloom filters require the ability to test and set single bits at a time. By using the NAND flash memory device's integrated logical function registers, these calculations are offloaded from the drive's processor(s) (e.g., CPUs 122), allowing for higher performance.

Flash memory devices utilize memory cells to store data as electrical values, such as electrical charges or voltages. Each flash memory cell typically includes a single transistor with a floating gate that is used to store a charge, which modifies the threshold voltage of the transistor (i.e., the voltage needed to turn the transistor on). The magnitude of the charge, and the corresponding threshold voltage the charge creates, is used to represent one or more data values. In some implementations, during a read operation, a reading threshold voltage is applied to the control gate of the transistor and the resulting sensed current or voltage is mapped to a data value.

The terms "cell voltage" and "memory cell voltage," in the context of flash memory cells, means the threshold voltage of the memory cell, which is the minimum voltage that needs to be applied to the gate of the memory cell's transistor in order for the transistor to conduct current. Similarly, reading threshold voltages (sometimes also called reading signals and reading voltages) applied to a flash memory cells are gate voltages applied to the gates of the flash memory cells to determine whether the memory cells conduct current at that gate voltage. In some implementations, when a flash memory cell's transistor conducts current at a given reading threshold voltage, indicating that the cell voltage is less than the reading threshold voltage, the raw data value for that read operation is a "1," and otherwise the raw data value is a "0."

Figure 2:
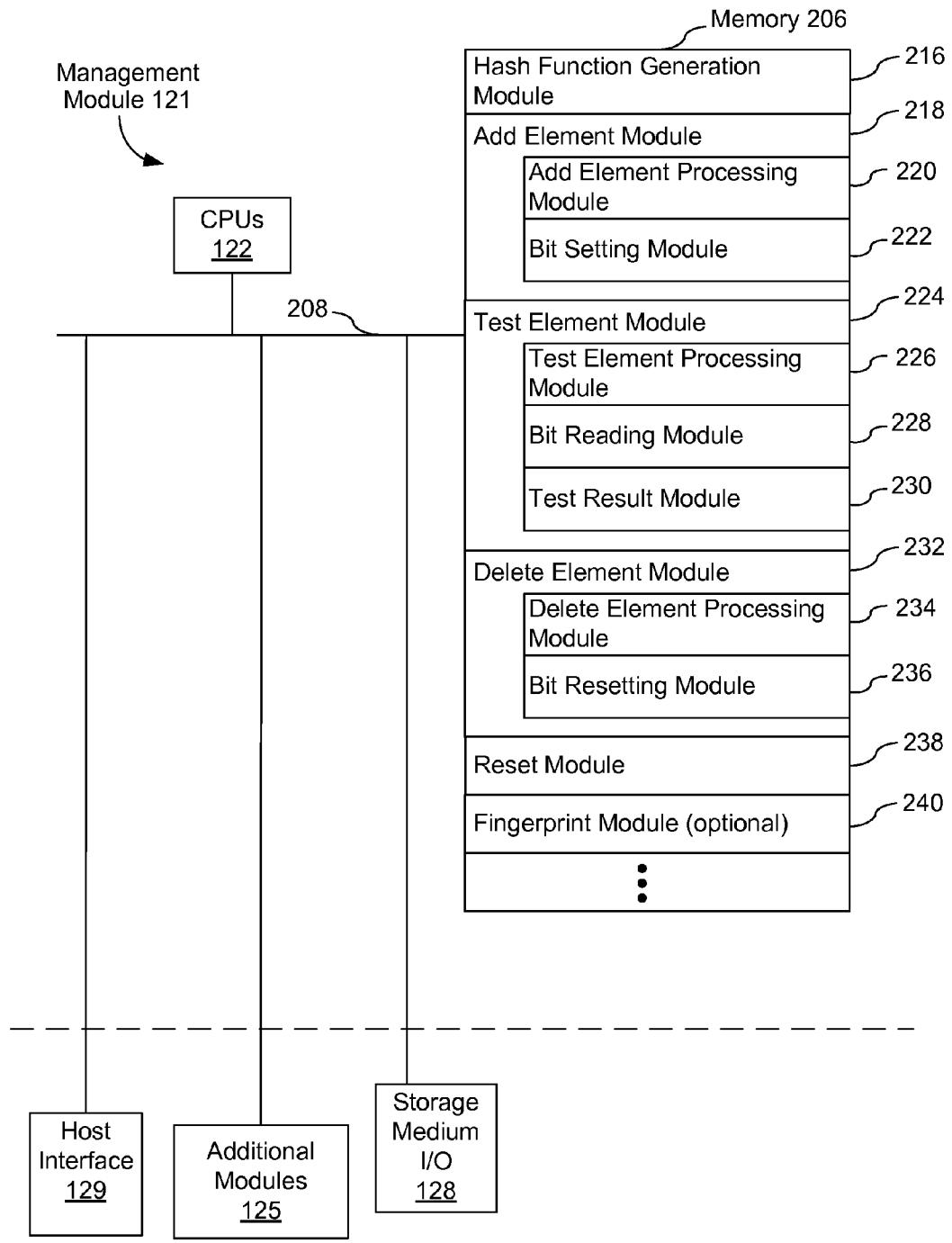
FIG. 2 is a block diagram illustrating an implementation of a management module, in accordance with some embodiments.

FIG. 2 is a block diagram illustrating an exemplary management module 121, in accordance with some embodiments. Management module 121 typically includes one or more processing units (CPUs) 122 for executing modules, programs and/or instructions stored in memory 206 and thereby performing processing operations, memory 206, and one or more communication buses 208 for interconnecting these components. Communication buses 208 optionally include circuitry (sometimes called a chipset) that interconnects and controls communications between system components. Management module 121 is coupled to host interface 129, additional module(s) 125, and storage medium I/O 128 by communication buses 208. Memory 206 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from the CPU(s) 122. Memory 206, or alternately the non-volatile memory device(s) within memory 206, comprises a non-transitory computer readable storage medium. In some embodiments, memory 206, or the computer readable storage medium of memory 206 stores the following programs, modules, and data structures, or a subset thereof:

- a hash function generation module 216 that is used for processing an element with k distinct hash functions to generate k bit positions in a Bloom filter (e.g., Bloom filter array(s) 131, FIG. 1);
- an add element module 218 that is used for adding elements to the Bloom filter;
- a test element module 224 that is used for testing whether an element is present in the Bloom filter;
- a delete element module 232 that is used for deleting an element from the Bloom filter;
- a reset module 238 that is used for resetting the Bloom filter to an empty state; and
- a fingerprint module 240 that is used for generating an n-bit fingerprint of an object to be added to the Bloom filter, where n is at least 64.

In some embodiments, the add element module 218 optionally includes the following modules or sub-modules, or a subset thereof:

- an add element processing module 220 that is used for processing the element to be added with k distinct hash functions to generate k bit positions in a Bloom filter and/or communicating with hash function generation module 216 to obtain the k bit positions; and
- a bit setting module 222 that is used for setting the k bit positions in the Bloom filter.

In some embodiments, the test element module 224 optionally includes the following modules or sub-modules, or a subset thereof:

- a test element processing module 226 that is used for processing the element to be tested with k distinct hash functions to generate k bit positions in a Bloom filter and/or communicating with hash function generation module 216 to obtain the k bit positions;
- a bit reading module 228 that is used for reading the k bit positions from the Bloom filter; and
- a test result module 230 that is used for returning a first result if all the k bit positions in the Bloom filter are set and returning a second result if at least a predetermined number (e.g., one or more) of the k bit positions in the Bloom filter are not set.

In some embodiments, the delete element module 232 optionally includes the following modules or sub-modules, or a subset thereof:

- a delete element processing module 234 that is used for processing the element to be deleted with k distinct hash functions to generate k bit positions in a Bloom filter and/or communicating with hash function generation module 216 to obtain the k bit positions; and
- a bit resetting module 236 that is used for resetting the k bit positions in the Bloom filter.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the computer readable storage medium of memory 206, provide instructions for implementing any of the methods described below with reference to FIGS. 4A-4E.

Although FIG. 2 shows a management module 121, FIG. 2 is intended more as functional description of the various features which may be present in a management module than as a structural schematic of the embodiments described herein. In practice, and as recognized by those of ordinary skill in the art, items shown separately could be combined and some items could be separated.

As discussed below with reference to FIG. 3, a single-level flash memory cell (SLC) stores one bit ("0" or "1"). Thus, the storage density of a SLC memory device is one bit of information per memory cell. A multi-level flash memory cell (MLC), however, can store two or more bits of information per cell by using different ranges within the total voltage range of the memory cell to represent a multi-bit bit-tuple. In turn, the storage density of a MLC memory device is multiple-bits per cell (e.g., two bits per memory cell).

Figure 3:
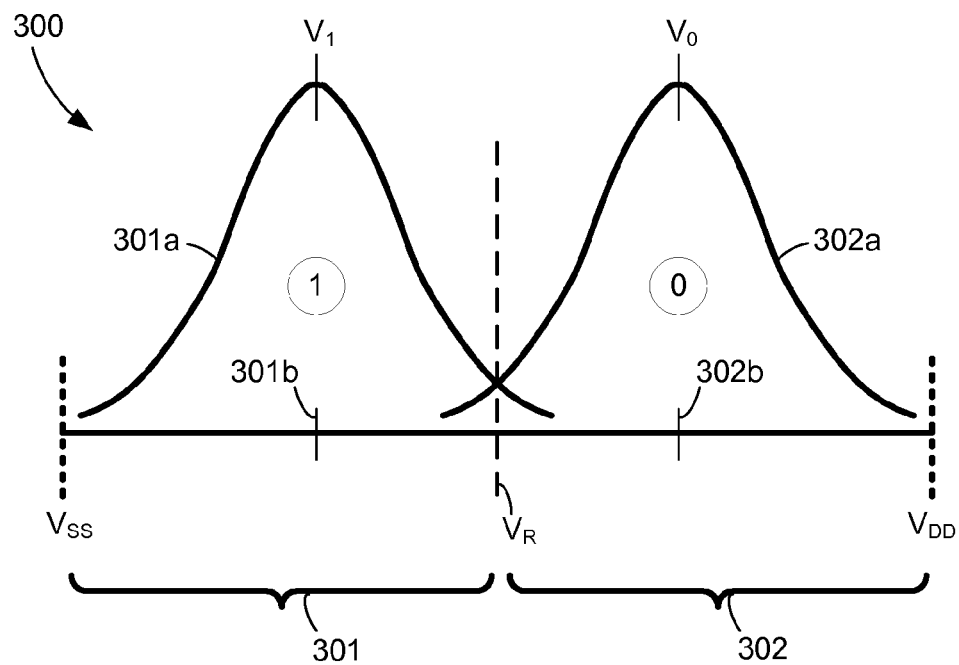
FIG. 3 is a prophetic diagram of voltage distributions that may be found in a single-level flash memory cell (SLC) over time, in accordance with some embodiments.
Figure 4A:
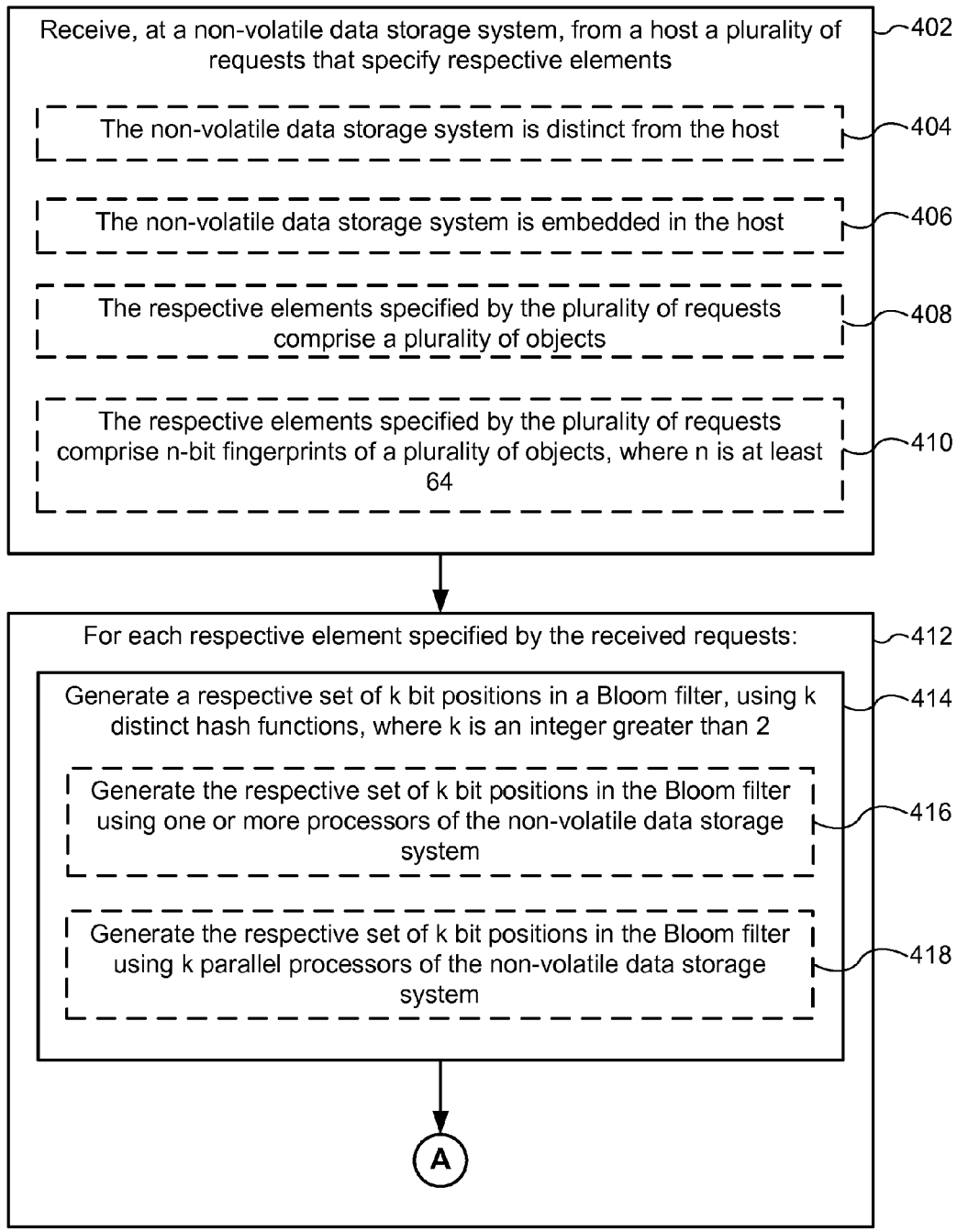
FIGS. 4A-4E illustrate a flowchart representation of a method for data processing, in accordance with some embodiments.
Figure 4B:
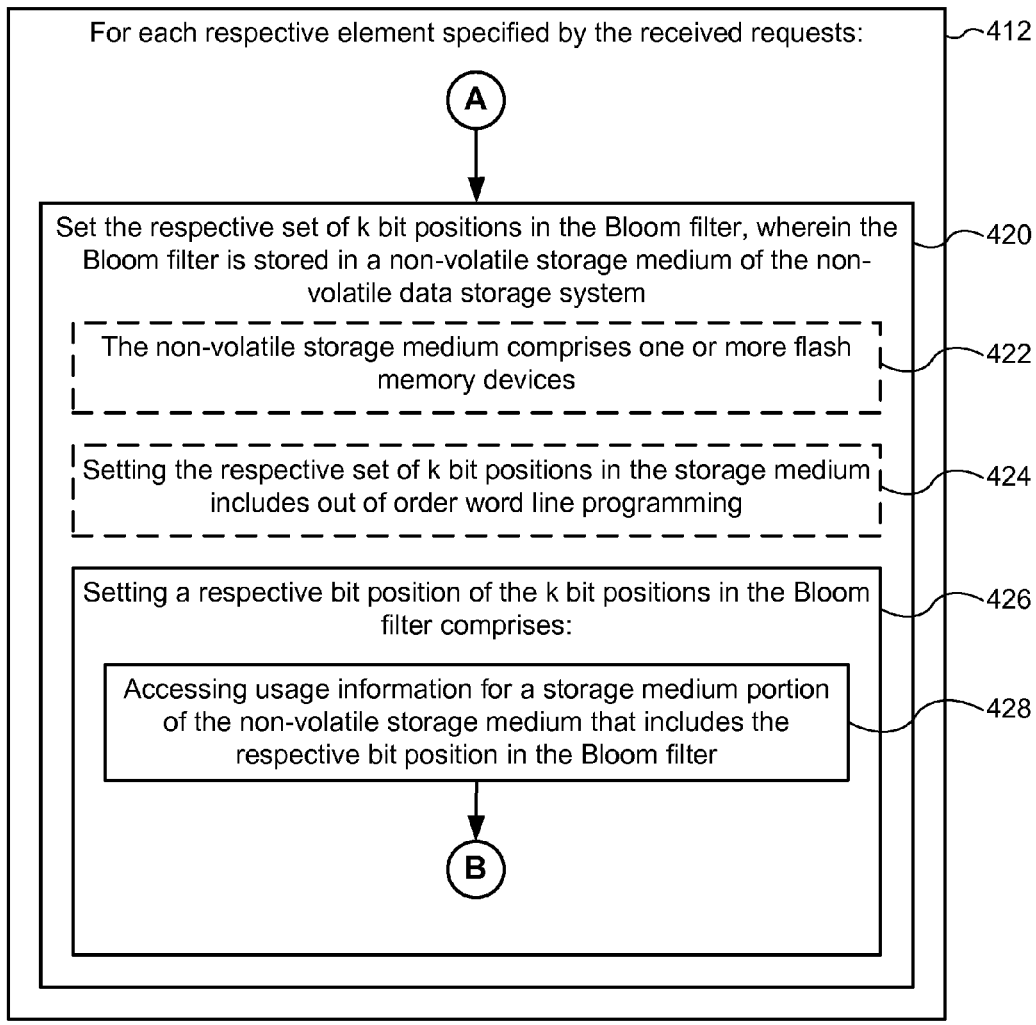
Figure 4C:
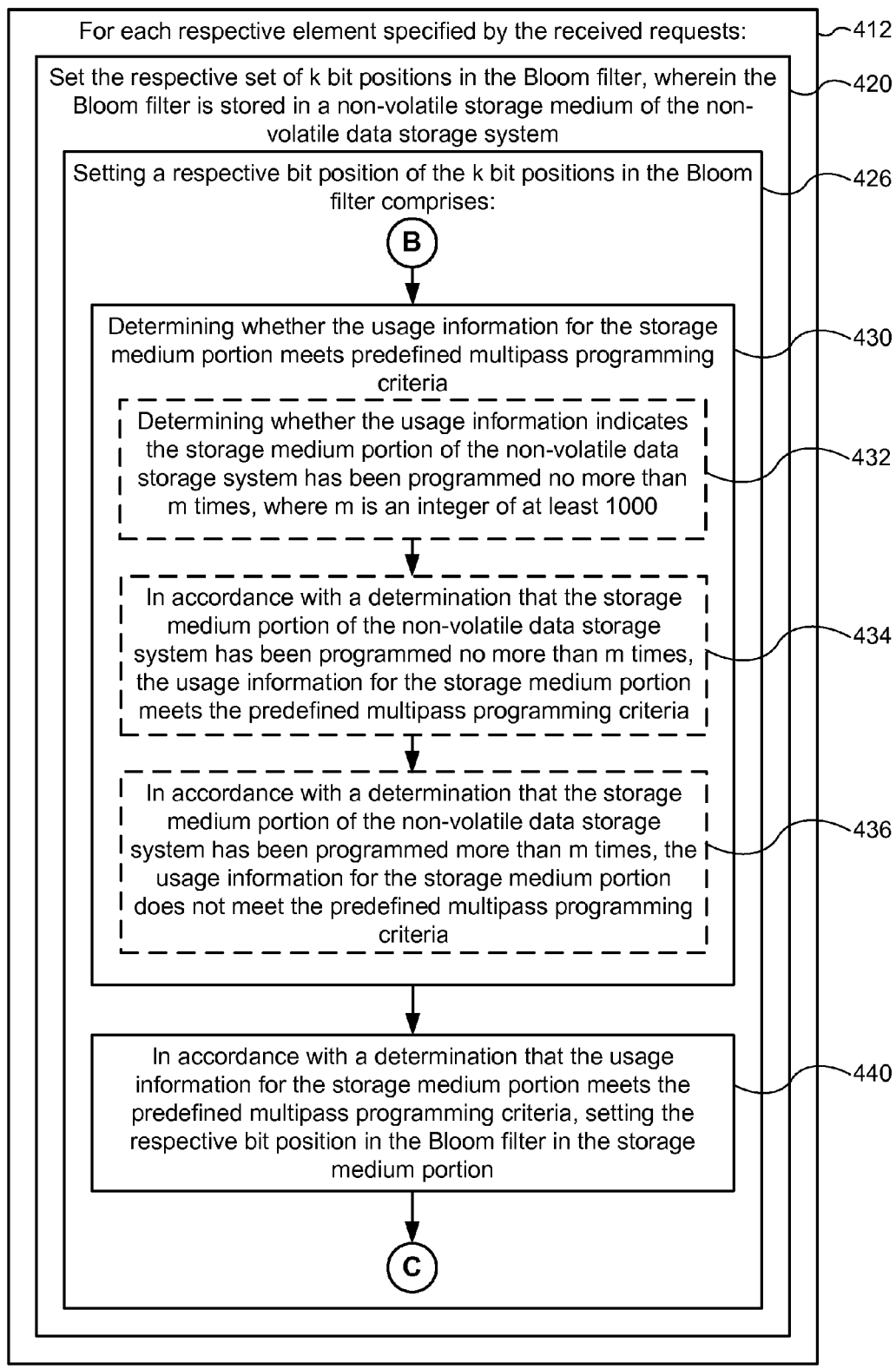
Figure 4D:
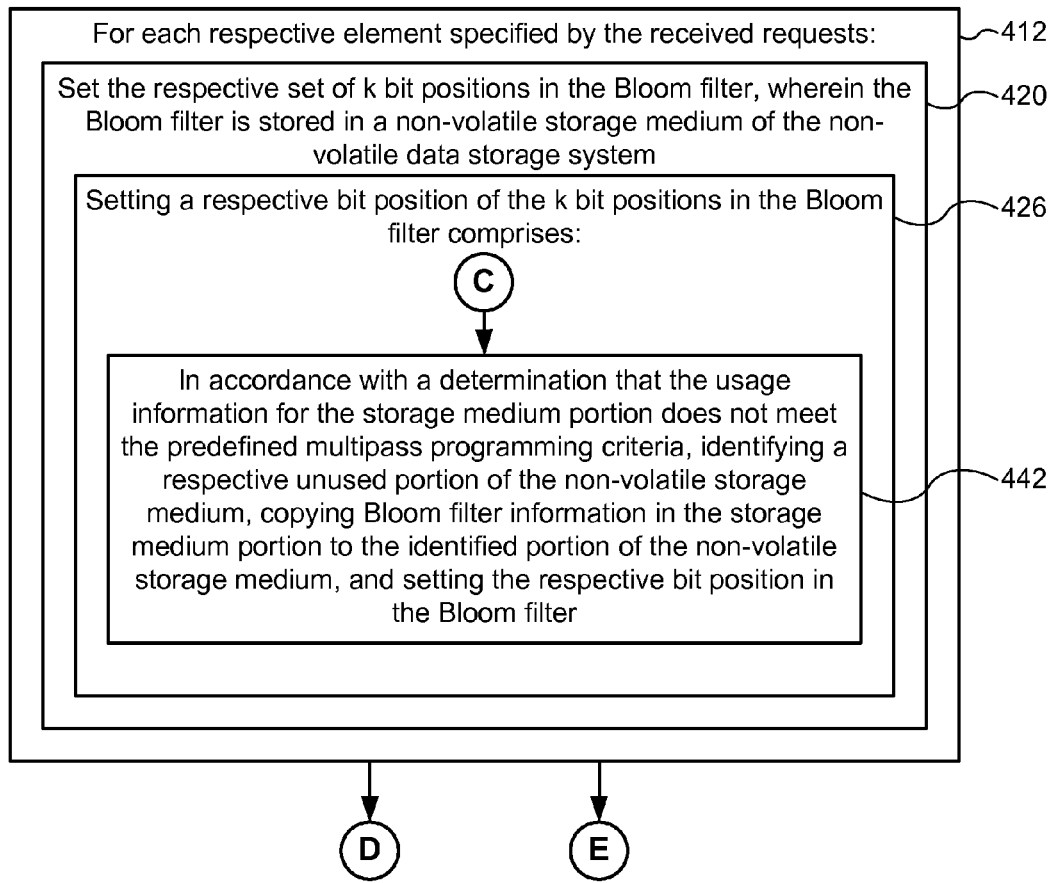
Figure 4E:
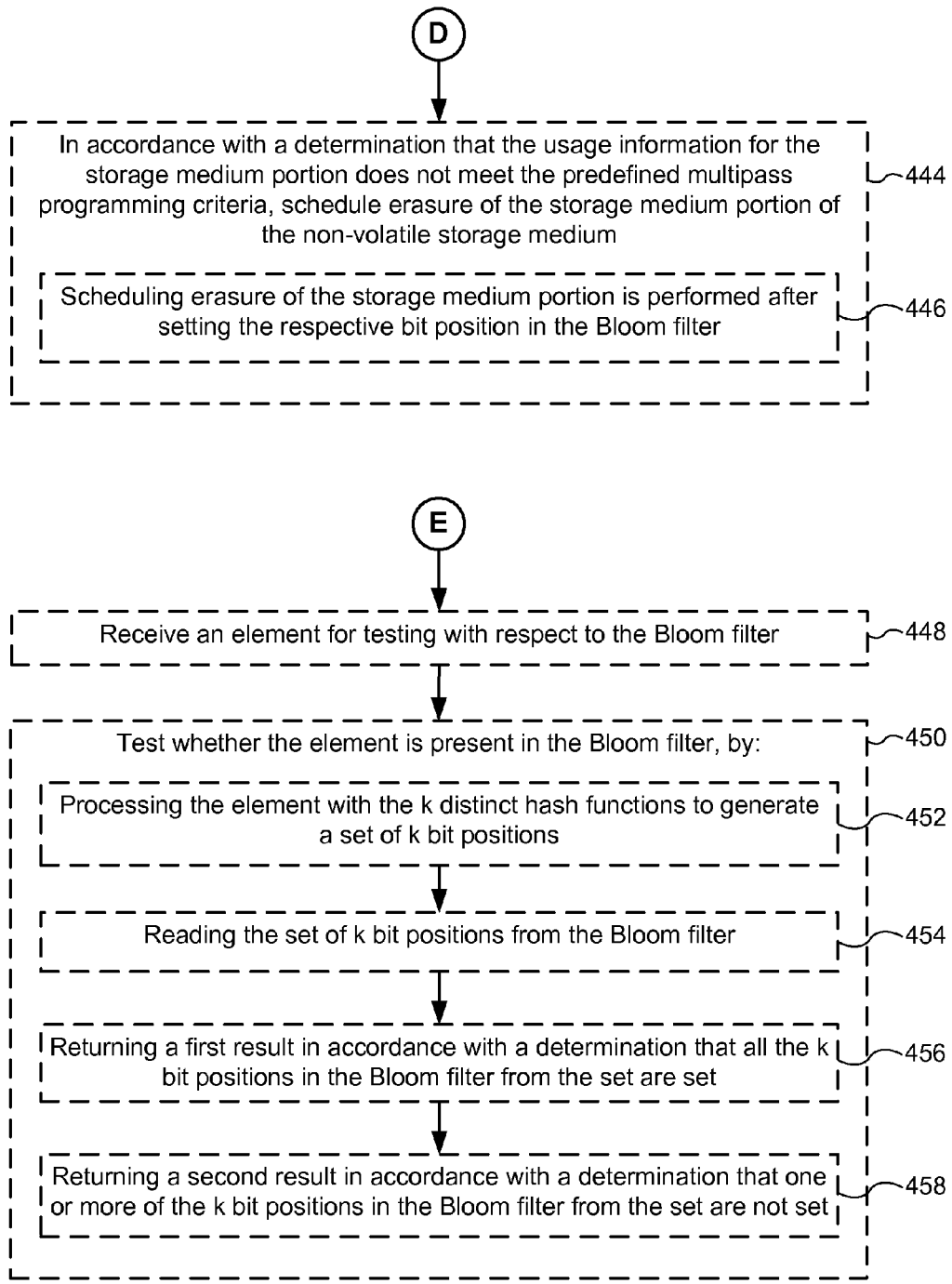

FIG. 3 is a simplified, prophetic diagram of voltage distributions 300 found in a single-level flash memory cell (SLC) over time, in accordance with some embodiments. The voltage distributions 300 shown in FIG. 3 have been simplified for illustrative purposes. In this example, the SLC's voltage range extends approximately from a voltage, $V_{SS}$, at a source terminal of an NMOS transistor to a voltage, $V_{DD}$, at a drain terminal of the NMOS transistor. As such, voltage distributions 300 extend between $V_{SS}$ and $V_{DD}$.

Sequential voltage ranges 301 and 302 between source voltage $V_{SS}$ and drain voltage $V_{DD}$ are used to represent corresponding bit values "1" and "0," respectively. Each voltage range 301, 302 has a respective center voltage $V_1$ 301b, $V_0$ 302b. As described below, in many circumstances the memory cell current sensed in response to an applied reading threshold voltages is indicative of a memory cell voltage different from the respective center voltage $V_1$ 301b or $V_0$ 302b corresponding to the respective bit value written into the memory cell. Errors in cell voltage, and/or the cell voltage sensed when reading the memory cell, can occur during write operations, read operations, or due to "drift" of the cell voltage between the time data is written to the memory cell and the time a read operation is performed to read the data stored in the memory cell. For ease of discussion, these effects are collectively described as "cell voltage drift." Each voltage range 301, 302 also has a respective voltage distribution 301a, 302a that may occur as a result of any number of a combination of error-inducing factors, examples of which are identified above.

In some implementations, a reading threshold voltage $V_R$ is applied between adjacent center voltages (e.g., applied proximate to the halfway region between adjacent center voltages $V_1$ 301b and $V_0$ 302b). Optionally, in some implementations, the reading threshold voltage is located between voltage ranges 301 and 302. In some implementations, reading threshold voltage $V_R$ is applied in the region proximate to where the voltage distributions 301a and 302a overlap, which is not necessarily proximate to the halfway region between adjacent center voltages $V_1$ 301b and $V_0$ 302b.

As explained above, a SLC memory device stores one bit of information ("0" or "1") per memory cell. In some embodiments, a Bloom filter is implemented in a SLC memory device, and uses a single-level flash memory cell for each bit of the N-bit array of the Bloom filter. In some embodiments (e.g., using some types of flash memory), the Bloom filter is initially cleared by resetting each bit of the N-bit array to "1" and elements are added to the Bloom filter by setting the corresponding k bits generated from the k hash functions to "0." In some embodiments, the Bloom filter is initially cleared by resetting each bit of the N-bit array to "0" and elements are added to the Bloom filter by setting the corresponding k bits generated from the k hash functions to "1."

In order to increase storage density in flash memory, flash memory has developed from single-level (SLC) cell flash memory to multi-level cell (MLC) flash memory so that two or more bits can be stored by each memory cell. A MLC flash memory device is used to store multiple bits by using voltage ranges within the total voltage range of the memory cell to represent different bit-tuples. A MLC flash memory device is typically more error-prone than a SLC flash memory device created using the same manufacturing process because the effective voltage difference between the voltages used to store different data values is smaller for a MLC flash memory device. Moreover, due to any number of a combination of factors, such as electrical fluctuations, defects in the storage medium, operating conditions, device history, and/or write-read circuitry, a typical error includes a stored voltage level in a particular MLC being in a voltage range that is adjacent to the voltage range that would otherwise be representative of the correct storage of a particular bit-tuple. The impact of such errors can be reduced by gray-coding the data, such that adjacent voltage ranges represent single-bit changes between bit-tuples.

As explained above, a storage medium (e.g., storage medium 130, FIG. 1) is divided into a number of addressable and individually selectable blocks and each block is optionally (but typically) further divided into a plurality of pages and/or word lines and/or sectors. While erasure of a storage medium is performed on a block basis, in many embodiments reading and programming of the storage medium is performed on a smaller subunit of a block (e.g., on a page basis, word line basis, or sector basis). In some embodiments, programming is performed on an entire page. In some embodiments, partial-page programming is used for writing smaller amounts of data. Using address-targeted partial-page programming, the number of operations (NOPs) is the maximum number of operations (e.g., the maximum number of times a partial page can be programmed) before an erase is required (e.g., erasure of the block containing the page). For the current technology, the maximum number of operations for SLC NAND memory devices is four and the maximum number of operations for MLC NAND memory devices is one. However, using the embodiments described here, a partial page may be written at least 1000 times before an erase is required. In some embodiments, for example, a word line may be written at least 1000 times before an erase is required, where the "writes" involve setting single bits (e.g., setting a bit from "1" to "0"), rather than writing both ones and zeros to the entire word line.

FIGS. 4A-4E illustrate a flowchart representation of a method 400 for data processing, in accordance with some embodiments. As noted above with respect to FIG. 1, when a host (e.g., computer system 110, FIG. 1, sometimes called a host) adds an element to a Bloom filter (e.g., Bloom filter array(s) 131), only a single host command is needed for each element. To add a plurality of elements to the Bloom filter, the host sends a plurality of requests with respective elements to be added, which initiates performance of method 400.

At least in some implementations, method 400 is performed by a non-volatile data storage system (e.g., data storage system 100, FIG. 1) or one or more components of the non-volatile data storage system (e.g., memory controller 120 and/or storage medium 130, FIG. 1). In some embodiments, method 400 is governed by instructions that are stored in a non-transitory computer readable storage medium and that are executed by one or more processors of a device, such as the one or more processing units (CPUs) 122 of management module 121, shown in FIGS. 1 and 2.

A non-volatile data storage system (e.g., data storage system 100, FIG. 1) receives (402) from a host (e.g., computer system 110, FIG. 1) a plurality of requests that specify respective elements. In some implementations, the plurality of requests are requests to add respective elements to a Bloom filter (e.g., Bloom filter array(s) 131, FIG. 1). As noted above, in some implementations, only a single host command (e.g., "Add Element") is needed to add a respective element to the Bloom filter. As an example, if three elements are to be added to the Bloom filter, the host would send three requests, the first request specifying the first element to be added to the Bloom filter, the second request specifying the second element to be added to the Bloom filter, and the third request specifying the third element to be added to the Bloom filter.

In some embodiments, the non-volatile data storage system is (404) distinct from the host. For example, in some implementations, one or more components of the non-volatile data storage system (e.g., memory controller 120 and storage medium 130 of data storage system 100, FIG. 1) are distinct from and coupled to a host (e.g., computer system 110, FIG. 1) by one or more connections (e.g., connections 101 and control line 111, FIG. 1).

In some embodiments, the non-volatile data storage system is (406) embedded in the host. In some implementations, one or more components of the non-volatile data storage system (e.g., memory controller 120 and storage medium 130 of data storage system 100, FIG. 1) are included in a device as components thereof. Furthermore, in some implementations, one or more components of the non-volatile data storage system (e.g., memory controller 120 and storage medium 130 of data storage system 100, FIG. 1) are embedded in a host device, such as a mobile device, tablet, other computer or computer controlled device, and the methods described herein are performed by the embedded data storage system.

In some embodiments, the respective elements specified (408) by the plurality of requests comprise a plurality of objects. In some implementations, for example, an object is a file (e.g., a 1 MB file). In some implementations, for example in data deduplication applications, an object is an email attachment in a forwarded email message. In some implementations, an object is mapped into an n-bit fingerprint by the non-volatile data storage system (e.g., data storage system 100, FIG. 1) before being processed for insertion in the Bloom filter. In some implementations, a fingerprint module (e.g., fingerprint module 240, FIG. 2) is used to generate an n-bit fingerprint of an object to be added to the Bloom filter, where n is at least 64, as described above with respect to FIG. 2.

In some embodiments, the respective elements specified (410) by the plurality of requests comprise n-bit fingerprints of a plurality of objects, where n is at least 64. In some implementations, an object is mapped into an n-bit number by a host (e.g., computer system 110, FIG. 1, sometimes called a host). In some implementations, for example, a 64-bit hash function is used to map data sets of variable length (e.g., a file or an email attachment) to data sets of a fixed length (e.g., 64 bits).

Next, for each respective element specified (412) by the received request, the non-volatile data storage system generates (414) a respective set of k bit positions (sometimes called a respective group of k bit positions) in a Bloom filter, using k distinct hash functions, where k is an integer greater than 2. As an example, if k is equal to 16, for a respective element specified in the received request, the non-volatile data storage system uses 16 distinct hash functions to generate a respective set of 16 bit positions in the Bloom filter. In some implementations, the respective set of k bit positions in the Bloom filter is generated in firmware (e.g., in management module 121, FIGS. 1 and 2). In some implementations, the respective set of k bit positions in the Bloom filter is generated in hardware (e.g., a hardware hash engine). In some implementations, the respective set of k bit positions in the Bloom filter is generated by a hash function generation module (e.g., hash function generation module 216, FIG. 2) and/or an add element processing module (e.g., add element processing module 220, FIG. 2), as described above with respect to FIG. 2.

In some embodiments, the non-volatile data storage system generates (416) the respective set of k bit positions in the Bloom filter using one or more processors of the non-volatile data storage system (e.g., CPUs 122, FIG. 1).

In some embodiments, the non-volatile data storage system generates (418) the respective set of k bit positions in the Bloom filter using k parallel processors of the non-volatile data storage system. In some other embodiments, the non-volatile data storage system generates the respective set of k bit positions in the Bloom filter using at least k/2 parallel processors of the non-volatile data storage system, while in yet other embodiments, the non-volatile data storage system generates the respective set of k bit positions in the Bloom filter using at least k/4 parallel processors of the non-volatile data storage system. In some implementations, the aforementioned one or more processors of the non-volatile data storage system (e.g., CPUs 122, FIG. 1) comprise parallel processors, and the respective set of k bit positions in the Bloom filter is generated using the parallel processors.

Furthermore, for each respective element specified (412) by the received request, the non-volatile data storage system sets (420) the respective set of k bit positions in the Bloom filter (e.g., Bloom filter array(s) 131, FIG. 1), wherein the Bloom filter is stored in a non-volatile storage medium (e.g., storage medium 130, FIG. 1) of the non-volatile data storage system.

In some embodiments, the non-volatile storage medium comprises (422) one or more flash memory devices. In some implementations, the non-volatile storage medium (e.g., storage medium 130, FIG. 1) is a single flash memory device, while in other implementations, the non-volatile storage medium includes a plurality of flash memory devices. In some implementations, the non-volatile storage medium (e.g., storage medium 130, FIG. 1) is NAND-type flash memory or NOR-type flash memory.

In some embodiments, setting (424) the respective set of k bit positions in the storage medium includes out of order word line programming. In some embodiments, out of order word line programming includes setting one or more bits on a first word line, the first word line positioned earlier in a block, subsequent to setting one or more bits on a second word line, the second word line positioned later in the block. For example, if a block has 128 word lines (e.g., word line 0 through word line 127), in order word line programming usually involves writing word line 0, word line 1, word line 2, ..., word line 126, and word line 127, in ascending order. An example of out of order word line programming includes writing word line 17 (e.g., setting one or more bits on word line 17) after writing word line 25 (e.g., setting one or more bits on word line 25).

In some embodiments, setting (426) a respective bit position of the k bit positions in the Bloom filter comprises accessing (428) usage information for a storage medium portion (e.g., a page, a word line, or a sector) of the non-volatile storage medium (e.g., storage medium 130, FIG. 1) that includes the respective bit position in the Bloom filter (e.g., Bloom filter array(s) 131, FIG. 1). For example, in some embodiments, if the respective bit position to be set in the Bloom filter is stored on word line 15, the non-volatile data storage system accesses usage information for word line 15. In some embodiments, usage information is a count of the number of times the storage medium portion has been programmed. In some implementations, a count of the number of bits that are "set" on the storage medium portion is the same as a count of the number of writes to the storage medium portion, since each write typically results in flipping only a single bit from "reset" to "set" (e.g., flipping a single bit from "1" to "0"). Alternatively, in some implementations, a counter could be kept in DRAM for each storage medium portion.

Next, setting (426) a respective bit position of the k bit positions in the Bloom filter further comprises determining (430) whether the usage information for the storage medium portion (e.g., a page, a word line, or a sector) meets predefined multipass programming criteria. For example, in some embodiments, if the respective bit position to be set in the Bloom filter is stored on word line 15, the non-volatile data storage system determines whether the usage information for word line 15 meets predefined multipass programming criteria.

In some embodiments, determining (430) whether the usage information for the storage medium portion meets predefined multipass programming criteria comprises determining (432) whether the usage information indicates the storage medium portion (e.g., a page, a word line, or a sector) of the non-volatile data storage system has been programmed no more than m times, where m is an integer of at least 1000. As used herein, the term "no more than m" may be construed to mean "less than or equal to m." For example, if m is equal to 1000, determining whether the usage information indicates the storage medium portion has been programmed no more than 1000 times is the same as determining whether the usage information indicates the storage medium portion has been programmed less than or equal to 1000 times.

Further, in some embodiments, in accordance with a determination that the storage medium portion of the non-volatile data storage system has been programmed no more than m times, the usage information for the storage medium portion meets (434) the predefined multipass programming criteria. As an example, if m is equal to 1000 and the respective bit position is on word line 15, if the usage information for word line 15 indicates that word line 15 has been programmed 1000 times or less, then the usage information for word line 15 meets the predefined multipass programming criteria.

Further, in some embodiments, in accordance with a determination that the storage medium portion of the non-volatile data storage system has been programmed more than m times, the usage information for the storage medium portion does not meet (436) the predefined multipass programming criteria. As an example, if m is equal to 1000 and the respective bit position is on word line 15, if the usage information for word line 15 indicates that word line 15 has been programmed 1001 times or more, then the usage information for word line 15 does not meet the predefined multipass programming criteria.

Next, setting (426) a respective bit position of the k bit positions in the Bloom filter further comprises, in accordance with a determination that the usage information for the storage medium portion (e.g., a page, a word line, or a sector) meets the predefined multipass programming criteria, setting (440) the respective bit position in the Bloom filter in the storage medium portion. As an example, if the respective bit position to be set is on word line 15 and if it is determined that the usage information for word line 15 meets the predefined multipass programming criteria (e.g., word line 15 has been programmed no more than m times), then the non-volatile data storage system sets the respective bit position on word line 15. Further, in some implementations, setting a respective bit position of the k bit positions in the Bloom filter includes identifying the storage medium portion of the non-volatile storage medium that includes the respective bit position in the Bloom filter, and setting the respective bit position in the Bloom filter in the storage medium portion without resetting any other bit positions in the storage medium portion.

Further, setting (426) a respective bit position of the k bit positions in the Bloom filter further comprises, in accordance with a determination that the usage information for the storage medium portion (e.g., a page, a word line, or a sector) does not meet the predefined multipass programming criteria, identifying (442) a respective unused portion of the non-volatile storage medium, copying Bloom filter information in the storage medium portion to the identified portion of the non-volatile storage medium, and setting the respective bit position in the Bloom filter. As an example, if the respective bit position to be set is on word line 15 and if it is determined that the usage information for word line 15 does not meet the predefined multipass programming criteria (e.g., word line 15 has been programmed more than m times), then the non-volatile data storage system identifies an unused word line, copies Bloom filter information from word line 15 to the identified unused word line, and sets the respective bit position in the Bloom filter.

Optionally, in accordance with a determination that the usage information for the storage medium portion does not meet the predefined multipass programming criteria, the non-volatile data storage system schedules (444) erasure of the storage medium portion of the non-volatile storage medium. Using the example above where the usage information for word line 15 does not meet the predefined multipass programming criteria, the non-volatile data storage system schedules erasure of word line 15 (e.g., erasure of the block containing word line 15).

In some embodiments, scheduling (446) erasure of the storage medium portion is performed after setting the respective bit position in the Bloom filter. Using the example above where the respective bit position to be set is on word line 15 and it is determined that the usage information for word line 15 does not meet the predefined multipass programming criteria, the non-volatile data storage system identifies an unused word line, copies Bloom filter information from word line 15 to the identified unused word line, sets the respective bit position in the Bloom filter, and in some embodiments, then schedules erasure of word line 15. Alternatively, erasure of the storage medium portion is scheduled after the copying but prior to setting the respective bit position in the Bloom filter. Using the previous example, in some embodiments, the non-volatile data storage system identifies an unused word line, copies Bloom filter information from word line 15 to the identified unused word line, schedules erasure of word line 15, and then sets the respective bit position in the Bloom filter.

Optionally, the non-volatile data storage system receives (448) an element (e.g., a first element) for testing with respect to the Bloom filter. In some embodiments, a non-volatile data storage system (e.g., data storage system 100, FIG. 1) receives an element for testing with respect to the Bloom filter (e.g., Bloom filter array(s) 131, FIG. 1) from a host (e.g., computer system 110, FIG. 1, sometimes called a host). As noted above, in some implementations, only a single host command (e.g., "Test Element") is needed to test whether the element is present in the Bloom filter.

Next, the non-volatile data storage system tests (450) whether the element is present in the Bloom filter by processing (452) the element with the k distinct hash functions to generate a set of k bit positions (sometimes called a group of k bit positions). As an example, if k is equal to 16, the non-volatile data storage system (e.g., data storage system 100, FIG. 1) processes the element with 16 distinct hash functions to generate a set of 16 bit positions in the Bloom filter (e.g., Bloom filter array(s) 131, FIG. 1). In some implementations, the respective set of k bit positions in the Bloom filter is generated in firmware (e.g., in management module 121, FIGS. 1 and 2). In some implementations, the respective set of k bit positions in the Bloom filter is generated in hardware (e.g., a hardware hash engine). In some implementations, the respective set of k bit positions in the Bloom filter is generated by a hash function generation module (e.g., hash function generation module 216, FIG. 2) and/or a test element processing module (e.g., test element processing module 226, FIG. 2), as described above with respect to FIG. 2.

In some embodiments, the non-volatile data storage system generates the respective set of k bit positions in the Bloom filter using one or more processors of the non-volatile data storage system (e.g., CPUs 122, FIG. 1).

In some embodiments, the non-volatile data storage system generates the respective set of k bit positions in the Bloom filter using k parallel processors (or, alternatively, at least k/2 parallel processors, or at least k/4 parallel processors, as discussed above) of the non-volatile data storage system. In some implementations, the aforementioned one or more processors of the non-volatile data storage system (e.g., CPUs 122, FIG. 1) comprise parallel processors, and the respective set of k bit positions in the Bloom filter is generated using the parallel processors.

The non-volatile data storage system further tests (450) whether the element is present in the Bloom filter by reading (454) the set of k bit positions from the Bloom filter. Using the example above where k is equal to 16, the non-volatile data storage system reads the set of 16 bit positions from the Bloom filter (e.g., Bloom filter array(s) 131, FIG. 1). In some implementations, the k bit positions are read from the Bloom filter using a bit reading module (e.g., bit reading module 228, FIG. 2), as described above with respect to FIG. 2.

Testing (450) whether the element is present in the Bloom filter further includes returning (456) a first result in accordance with a determination that all the k bit positions in the Bloom filter from the set are set. In some implementations, using the example above where k is equal to 16, the non-volatile data storage system (e.g., data storage system 100, FIG. 1) returns a first result in accordance with a determination that all 16 bit positions in the Bloom filter (e.g., Bloom filter array(s) 131, FIG. 1) from the set are set, indicating that the element is present in the Bloom filter with high probability. In some implementations, the first result is returned (e.g., in accordance with a determination that all the k bit positions in the Bloom filter from the set are set) using a test result module (e.g., test result module 230, FIG. 2), as described above with respect to FIG. 2.

Further, testing (450) whether the element is present in the Bloom filter includes returning (458) a second result in accordance with a determination that one or more of the k bit positions in the Bloom filter from the set are not set. In some implementations, the non-volatile data storage system (e.g., data storage system 100, FIG. 1) returns a second result in accordance with a determination that one or more of the k bit positions in the Bloom filter (e.g., Bloom filter array(s) 131, FIG. 1) from the set are not set, indicating that the element is not present in the Bloom filter. In some implementations, the second result is returned (e.g., in accordance with a determination that one or more of the k bit positions in the Bloom filter from the set are not set) using a test result module (e.g., test result module 230, FIG. 2), as described above with respect to FIG. 2.

In some implementations, with respect to any of the methods described above, the storage medium (e.g., storage medium 130, FIG. 1) is a single flash memory device, while in other implementations, the storage medium (e.g., storage medium 130, FIG. 1) includes a plurality of flash memory devices.

In some implementations, with respect to any of the methods described above, a data storage system includes a non-volatile storage medium (e.g., storage medium 130, FIG. 1), one or more processors (e.g., CPUs 122, FIGS. 1 and 2) and memory (e.g., memory 206, FIG. 2) storing one or more programs configured for execution by the one or more processors and configured to perform or control performance of any of the methods described above.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

What is claimed is:

1. A data processing method, comprising:
   at a non-volatile data storage system:
     receiving from a host a plurality of requests that specify respective elements; and
     for each respective element specified by the received requests:
       generating a respective set of k bit positions in a Bloom filter, using k distinct hash functions, where k is an integer greater than 2; and
       setting the respective set of k bit positions in the Bloom filter, wherein the Bloom filter is stored in a non-volatile storage medium of the non-volatile data storage system; and
   wherein setting a respective bit position of the k bit positions in the Bloom filter comprises:
     accessing usage information for a storage medium portion of the non-volatile storage medium that includes the respective bit position in the Bloom filter;
     determining whether the usage information for the storage medium portion meets predefined multipass programming criteria;
     in accordance with a determination that the usage information for the storage medium portion meets the predefined multipass programming criteria, setting the respective bit position in the Bloom filter in the storage medium portion; and
     in accordance with a determination that the usage information for the storage medium portion does not meet the predefined multipass programming criteria, identifying a respective unused portion of the non-volatile storage medium, copying Bloom filter information in the storage medium portion to the identified portion of the non-volatile storage medium, and setting the respective bit position in the Bloom filter.

2. The method of claim 1, including generating the respective set of k bit positions in the Bloom filter using one or more processors of the non-volatile data storage system.

3. The method of claim 1, including generating the respective set of k bit positions in the Bloom filter using k parallel processors of the non-volatile data storage system.

4. The method of claim 1, further comprising:
   in accordance with a determination that the usage information for the storage medium portion does not meet the predefined multipass programming criteria, scheduling erasure of the storage medium portion of the non-volatile storage medium.

5. The method of claim 4, wherein the scheduling erasure of the storage medium portion is performed after setting the respective bit position in the Bloom filter.

6. The method of claim 1, wherein the determining whether the usage information for the storage medium portion meets predefined multipass programming criteria comprises:
  determining whether the usage information indicates the storage medium portion of the non-volatile data storage system has been programmed no more than m times, where m is an integer of at least 1000;
  in accordance with a determination that the storage medium portion of the non-volatile data storage system has been programmed no more than m times, the usage information for the storage medium portion meets the predefined multipass programming criteria; and
  in accordance with a determination that the storage medium portion of the non-volatile data storage system has been programmed more than m times, the usage information for the storage medium portion does not meet the predefined multipass programming criteria.

7. The method of claim 1, wherein setting the respective set of k bit positions in the storage medium includes out of order word line programming.

8. The method of claim 1, further comprising:
  receiving an element for testing with respect to the Bloom filter;
  testing whether the element is present in the Bloom filter, by;
    processing the element with the k distinct hash functions to generate a set of k bit positions;
    reading the set of k bit positions from the Bloom filter;
    returning a first result in accordance with a determination that all the k bit positions in the Bloom filter from the set are set; and
    returning a second result in accordance with a determination that one or more of the k bit positions in the Bloom filter from the set are not set.

9. The method of claim 1, wherein the non-volatile storage medium comprises one or more flash memory devices.

10. The method of claim 1, wherein the non-volatile data storage system is distinct from the host.

11. The method of claim 1, wherein the non-volatile data storage system is embedded in the host.

12. A non-volatile data storage system, comprising:
  a non-volatile storage medium storing a Bloom filter;
  one or more processors; and
  memory storing one or more programs, which when executed by the one or more processors cause the non-volatile data storage system to:
    receive from a host a plurality of requests that specify respective elements; and
    for each respective element specified by the received requests:
      generate a respective set of k bit positions in a Bloom filter, using k distinct hash functions, where k is an integer greater than 2; and
      set the respective set of k bit positions in the Bloom filter; and
  wherein setting a respective bit position of the k bit positions in the Bloom filter comprises:
    accessing usage information for a storage medium portion of the non-volatile storage medium that includes the respective bit position in the Bloom filter;
    determining whether the usage information for the storage medium portion meets predefined multipass programming criteria;
    in accordance with a determination that the usage information for the storage medium portion meets the predefined multipass programming criteria, setting the respective bit position in the Bloom filter in the storage medium portion; and
    in accordance with a determination that the usage information for the storage medium portion does not meet the predefined multipass programming criteria, identifying a respective unused portion of the non-volatile storage medium, copying Bloom filter information in the storage medium portion to the identified portion of the non-volatile storage medium, and setting the respective bit position in the Bloom filter.

13. The system of claim 12, wherein the respective set of k bit positions in the Bloom filter is generated using the one or more processors of the non-volatile data storage system.

14. The system of claim 12, wherein the one or more processors of the non-volatile data storage system comprise k parallel processors, and the respective set of k bit positions in the Bloom filter is generated using the k parallel processors.

15. The system of claim 12, wherein the one or more programs further include instructions that, when executed by the one or more processors, cause the non-volatile data storage system to:
  schedule erasure of the storage medium portion of the non-volatile storage medium, in accordance with a determination that the usage information for the storage medium portion does not meet the predefined multipass programming criteria.

16. The system of claim 15, wherein the instructions for scheduling erasure of the storage medium portion comprise instructions for scheduling erasure of the storage medium portion after setting the respective bit position in the Bloom filter.

17. The system of claim 12, wherein the one or more programs include instructions that, when executed by the one or more processors, cause the non-volatile data storage system to determine whether the usage information for the storage medium portion meets predefined multipass programming criteria, by:
  determining whether the usage information indicates the storage medium portion of the non-volatile data storage system has been programmed no more than m times, where m is an integer of at least 1000;
  in accordance with a determination that the storage medium portion of the non-volatile data storage system has been programmed no more than m times, the usage information for the storage medium portion meets the predefined multipass programming criteria; and
  in accordance with a determination that the storage medium portion of the non-volatile data storage system has been programmed more than m times, the usage information for the storage medium portion does not meet the predefined multipass programming criteria.

18. The system of claim 12, wherein the instructions for setting the respective set of k bit positions in the storage medium include instructions for out of order word line programming.

19. The system of claim 12, wherein the one or more programs further include instructions that, when executed by the one or more processors, cause the non-volatile data storage system to:
  receive an element for testing with respect to the Bloom filter;

test whether the element is present in the Bloom filter, by;
processing the element with the k distinct hash functions to generate a set of k bit positions;
reading the set of k bit positions from the Bloom filter;
returning a first result in accordance with a determination that all the k bit positions in the Bloom filter from the set are set; and
returning a second result in accordance with a determination that one or more of the k bit positions in the Bloom filter from the set are not set.

20. The system of claim 12, wherein the non-volatile storage medium comprises one or more flash memory devices.

21. The system of claim 12, wherein the non-volatile data storage system is distinct from the host.

22. The system of claim 12, wherein the non-volatile data storage system is embedded in the host.

23. A non-transitory computer readable storage medium storing one or more programs configured for execution by one or more processors of a non-volatile data storage system, the one or more programs comprising instructions for causing the non-volatile data storage system to:
receive from a host a plurality of requests that specify respective elements; and
for each respective element specified by the received requests:
generate a respective set of k bit positions in a Bloom filter, using k distinct hash functions, where k is an integer greater than 2; and
set the respective set of k bit positions in the Bloom filter, wherein the Bloom filter is stored in a non-volatile storage medium of the non-volatile data storage system; and
wherein setting a respective bit position of the k bit positions in the Bloom filter comprises:
accessing usage information for a storage medium portion of the non-volatile storage medium that includes the respective bit position in the Bloom filter;
determining whether the usage information for the storage medium portion meets predefined multipass programming criteria;
in accordance with a determination that the usage information for the storage medium portion meets the predefined multipass programming criteria, setting the respective bit position in the Bloom filter in the storage medium portion; and
in accordance with a determination that the usage information for the storage medium portion does not meet the predefined multipass programming criteria, identifying a respective unused portion of the non-volatile storage medium, copying Bloom filter information in the storage medium portion to the identified portion of the non-volatile storage medium, and setting the respective bit position in the Bloom filter.

24. The non-transitory computer readable storage medium of claim 23, wherein the respective set of k bit positions in the Bloom filter is generated using the one or more processors of the non-volatile data storage system.

25. The non-transitory computer readable storage medium of claim 23, wherein the one or more programs further include instructions that, when executed by the one or more processors, cause the non-volatile data storage system to:
schedule erasure of the storage medium portion of the non-volatile storage medium, in accordance with a determination that the usage information for the storage medium portion does not meet the predefined multipass programming criteria.

26. The non-transitory computer readable storage medium of claim 25, wherein the instructions for scheduling erasure of the storage medium portion comprise instructions for scheduling erasure of the storage medium portion after setting the respective bit position in the Bloom filter.

27. The non-transitory computer readable storage medium of claim 23, wherein the one or more programs include instructions that, when executed by the one or more processors, cause the non-volatile data storage system to determine whether the usage information for the storage medium portion meets predefined multipass programming criteria, by:
determining whether the usage information indicates the storage medium portion of the non-volatile data storage system has been programmed no more than m times, where m is an integer of at least 1000;
in accordance with a determination that the storage medium portion of the non-volatile data storage system has been programmed no more than m times, the usage information for the storage medium portion meets the predefined multipass programming criteria; and
in accordance with a determination that the storage medium portion of the non-volatile data storage system has been programmed more than m times, the usage information for the storage medium portion does not meet the predefined multipass programming criteria.

28. The non-transitory computer readable storage medium of claim 23, wherein the instructions for setting the respective set of k bit positions in the storage medium include instructions for out of order word line programming.

29. The non-transitory computer readable storage medium of claim 23, wherein the one or more programs further include instructions that, when executed by the one or more processors, cause the non-volatile data storage system to:
receive an element for testing with respect to the Bloom filter;
test whether the element is present in the Bloom filter, by;
processing the element with the k distinct hash functions to generate a set of k bit positions;
reading the set of k bit positions from the Bloom filter;
returning a first result in accordance with a determination that all the k bit positions in the Bloom filter from the set are set; and
returning a second result in accordance with a determination that one or more of the k bit positions in the Bloom filter from the set are not set.

30. The non-transitory computer readable storage medium of claim 23, wherein the non-volatile storage medium comprises one or more flash memory devices.

* * * * *